United States Patent
Kocsis et al.

(10) Patent No.: US 12,034,770 B2
(45) Date of Patent: Jul. 9, 2024

(54) 3S-CHAIN: SMART, SECURE, AND SOFTWARE-DEFINED NETWORKING (SDN)-POWERED BLOCKCHAIN-POWERED NETWORKING AND MONITORING SYSTEM

(71) Applicants: Jin Kocsis, Lafayette, IN (US); Mututhanthrige Praveen Sameera Fernando, Akron, OH (US); Yifu Wu, Akron, OH (US)

(72) Inventors: Jin Kocsis, Lafayette, IN (US); Mututhanthrige Praveen Sameera Fernando, Akron, OH (US); Yifu Wu, Akron, OH (US)

(73) Assignee: The University of Akron, Akron, OH (US)

( * ) Notice: Subject to any disclaimer, the term of this patent is extended or adjusted under 35 U.S.C. 154(b) by 330 days.

(21) Appl. No.: 17/297,270

(22) PCT Filed: Nov. 19, 2019

(86) PCT No.: PCT/US2019/062167
§ 371 (c)(1),
(2) Date: May 26, 2021

(87) PCT Pub. No.: WO2020/112436
PCT Pub. Date: Jun. 4, 2020

(65) Prior Publication Data
US 2022/0030031 A1    Jan. 27, 2022

Related U.S. Application Data

(60) Provisional application No. 62/771,230, filed on Nov. 26, 2018.

(51) Int. Cl.
*H04L 29/06* (2006.01)
*G06F 21/64* (2013.01)
(Continued)

(52) U.S. Cl.
CPC ............. *H04L 63/20* (2013.01); *G06F 21/64* (2013.01); *H04L 9/3236* (2013.01);
(Continued)

(58) Field of Classification Search
None
See application file for complete search history.

(56) References Cited

U.S. PATENT DOCUMENTS 10,333,833 B2 *  6/2019  Ponnuswamy ..... H04L 41/0654
10,361,859 B2 *  7/2019  Clark ................... H04L 67/104
(Continued)

OTHER PUBLICATIONS

Arins, Andis. Blockchain based Inter-domain Latency Aware Routing Proposal in Software Defined Network. 2018 IEEE 6th Workshop on Advances in Information, Electronic and Electrical Engineering (AIEEE). https://ieeexplore.ieee.org/stamp/stamp.jsp?tp=&arnumber=8592203 (Year: 2018).*
(Continued)

*Primary Examiner* — Jeremiah L Avery
(74) *Attorney, Agent, or Firm* — Renner, Kenner, Greive, Bobak, Taylor & Weber Co., LPA

(57) ABSTRACT

In one or more embodiments, the present invention is directed to a blockchain secured, software-defined network and monitoring system comprising: a multi-controller software-defined network (SDN) network layer; a blockchain based security and autonomy layer; a deep learning-driven decision making layer comprising the one or more computational centers and a horizontal data plane layer. In some embodiments, the present invention is directed to methods for ensuring the integrity of a control commands and optimizing performance and security using the blockchain secured, software-defined network and monitoring system. In various embodiments, the present invention relates to methods for extracting useful features from said labelled and non-labelled data contained in the horizontal data plane
(Continued)

layer in the blockchain secured, software-defined network and monitoring system using a knowledge domain-enabled hybrid semi-supervision learning method.

21 Claims, 12 Drawing Sheets

(51) Int. Cl.
*H04L 9/32* (2006.01)
*H04L 9/40* (2022.01)
*H04L 41/00* (2022.01)
*H04L 9/00* (2022.01)

(52) U.S. Cl.
CPC ............ *H04L 9/3297* (2013.01); *H04L 41/20* (2013.01); *H04L 9/50* (2022.05)

(56) References Cited

U.S. PATENT DOCUMENTS

| | | | |
|---|---|---|---|
| 10,554,483 B2* | 2/2020 | Nagarajan | H04L 41/08 |
| 10,567,229 B2* | 2/2020 | Pani | H04L 61/5007 |
| 10,572,495 B2* | 2/2020 | Raghavan | H04L 43/08 |
| 10,587,484 B2* | 3/2020 | Nazar | H04L 43/04 |
| 11,714,572 B2* | 8/2023 | Kannan | G06F 3/0614 |
| | | | 711/114 |
| 2017/0346752 A1 | 11/2017 | Krishnamurthy et al. | |
| 2017/0366416 A1* | 12/2017 | Beecham | H04L 45/50 |
| 2018/0247191 A1* | 8/2018 | Katz | H04L 9/50 |
| 2018/0309632 A1* | 10/2018 | Kompella | H04L 41/0866 |
| 2018/0367388 A1* | 12/2018 | Pani | H04L 41/0895 |
| 2018/0367449 A1* | 12/2018 | Pani | H04L 41/0686 |
| 2019/0058709 A1* | 2/2019 | Kempf | G06F 21/64 |
| 2019/0173736 A1* | 6/2019 | Ponnuswamy | H04L 41/145 |

OTHER PUBLICATIONS

Basnet, Sadhu Ram; Shakya, Subarna. BSS: Blockchain security over software defined network. 2017 International Conference on Computing, Communication and Automation (ICCCA). https://ieeexplore.ieee.org/stamp/stamp.jsp?tp=&arnumber=8229910 (Year: 2017).*

Katoka, Kotaro et al. Trust list: Internet-wide and distributed IoT traffic management using blockchain and SDN. 2018 IEEE 4th World Forum on Internet of Things (WF-IoT). https://ieeexplore.ieee.org/stamp/stamp.jsp?tp=&arnumber=8355139 (Year: 2018).*

* cited by examiner

Algorithm 1: Domain Knowledge—Enabled Hybrid Semi-Supervision Learning Method 1 Initialize the parameters of the primary, secondary, and feature-latent neural networks, $\theta_p$, $\theta'_p$, $\theta_s$ and $\theta_l$ where $\theta'_p \subsetneq \theta_p$;
2 while *not converging* do
3     $\theta_l^{t+1} \leftarrow \underset{\theta_l}{\mathrm{argmin}} L_3\left(\theta'^{t}_p, \theta_l^t\right);$
4     $\theta_p^{t+1} \leftarrow \underset{\theta_p}{\mathrm{argmin}} L_3(\theta'^{t}_p, \theta_l^{t+1});$
5     $\theta_p^{t+1} \leftarrow \underset{\theta_p}{\mathrm{argmin}}(L_1\left(\theta_p^{t+1}\right) + L_2\left(\theta_p^{t+1}, \theta_s^{t+1}\right));$
6     $\theta_s^{t+1} \leftarrow \beta \theta_p^{t+1} + (1-\beta)\theta_p^t$
7 Done;

FIG. 10

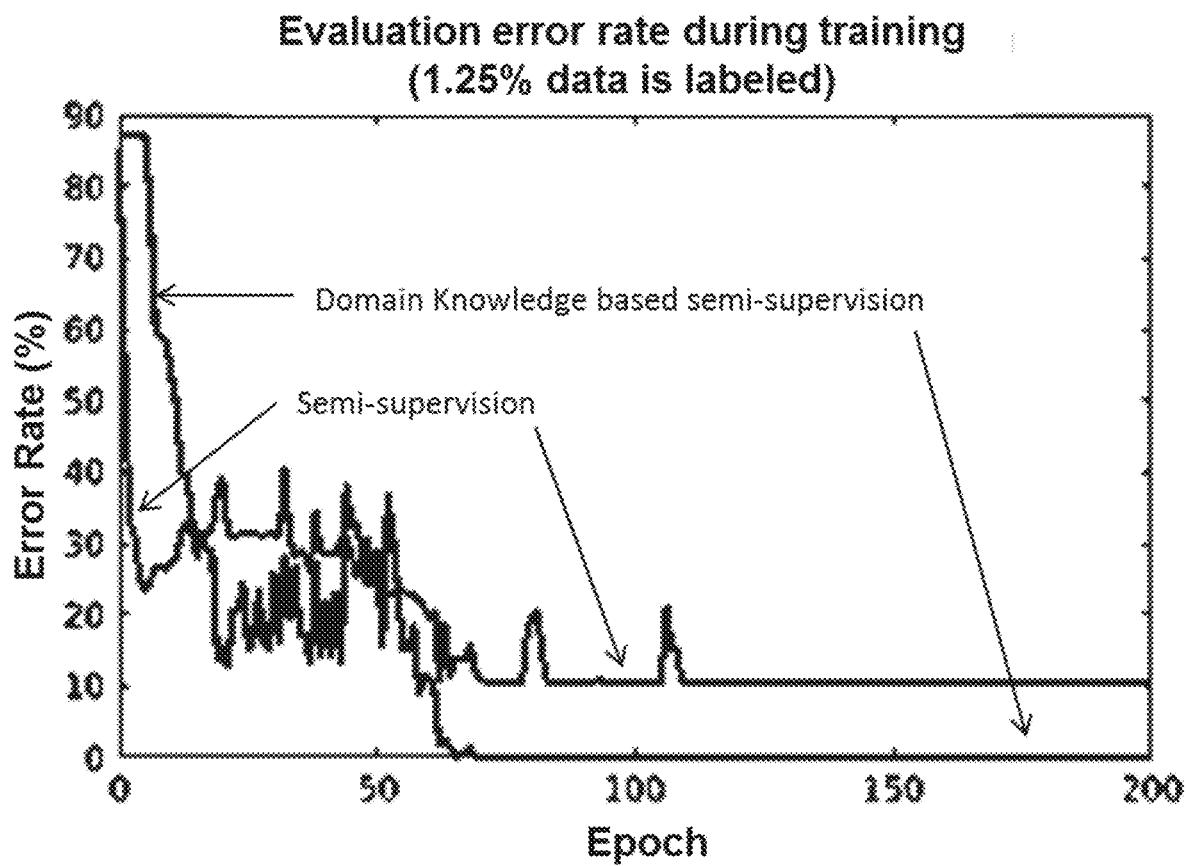

FIG. 11

3S-CHAIN: SMART, SECURE, AND SOFTWARE-DEFINED NETWORKING (SDN)-POWERED BLOCKCHAIN-POWERED NETWORKING AND MONITORING SYSTEM

CROSS REFERENCE TO RELATED APPLICATIONS

This application claims the benefit of International application serial number PCT/US19/62167 entitled "3S-Chain: Smart, Secure, and Software-Defined Networking (SDN)-Powered Blockchain-Powered Networking and Monitoring System," filed Nov. 19, 2019, which claims the benefit of U.S. provisional patent application Ser. No. 62/771,230 entitled "3S-Chain: Smart, Secure, and Software-defined networking (SDN)-powered blockchain-powered networking and monitoring system," filed Nov. 26, 2018, and incorporated herein by reference in its entirety.

STATEMENT REGARDING FEDERALLY SPONSORED RESEARCH OR DEVELOPMENT SUPPORT

This invention was made with government support under 80NSSC17K0530 awarded by the National Aeronautics and Space Administration (NASA). The government has certain rights in the invention.

NAMES OF THE PARTIES TO A JOINT RESEARCH AGREEMENT

The present application stems from work done pursuant to a Joint Research Agreement between The University of Akron of Akron, Ohio and National Aeronautics and Space Administration (NASA).

FIELD OF THE INVENTION

One or more embodiments of the present invention relates to secure software-defined networking systems. In certain embodiments, the present invention relates to Smart, Secure, and Software-defined networking (SDN)-powered, blockchain secured networking and monitoring systems.

BACKGROUND OF THE INVENTION

Software-Defined Networking (SDN) is a promising technology which removes the control plane from individual switches and transfers it to a centralized controller that has the complete topological view of the network that is available to all the switches in the network. SDN has gained widespread popularity due to its high controllability and low operation cost. However, there still remain essential challenges of implementing SDN such as the scalability and security of the control plane. Additionally, although blockchain is an emerging technology to enable secure and distributed data analysis and communications, the conventional networking infrastructure does not provide the effective and resilient peer-to-peer (P2P) networking functionality.

In addition, machine learning, especially deep learning, has recently achieved success in diverse tasks of supervised learning. As will be appreciated, a good predictive model of supervised learning needs a large set of annotated training examples. A training example usually contains two parts: a feature vector and a label. The vector indicates an observed event or an object. And the label represents the ground-truth outcome.

The data annotation/labeling process can be expensive and difficult, however, and it is often more desirable in practice to use weakly supervised learning rather than supervised learning. Weak supervision machine learning has three types: incomplete supervision, inexact supervision and inaccurate supervision. The most common one is incomplete supervision. Incomplete supervision assumes training data is mostly unlabeled and only a small subset of it is annotated. In these systems, there are two approaches used to leverage the unlabeled data. The first one is active learning. Active learning efficiently utilizes the knowledge of domain experts to selectively label a small amount of training data which are the most valuable for training model. The second one is semi-supervised learning (SSL) which combines supervised learning and unsupervised learning together. In these systems, generative model, low-density separation, and graph-based model are used to analyze unlabeled data.

Recent studies utilize heuristic model to analyze unlabeled training data and generate weak labels for them. Heuristic models used for semi supervision have a prerequisite that the labeled samples and unlabeled samples share the same or similar data distribution. Assuming there is a classification task, proposed a bootstrapping method by utilizing a neural network's inference of unlabeled sample as the pseudo label. In other words, the class with the maximum logit will be considered as the pseudo label. Then these pseudo labels are used to regularize the network in turn. So, the cost function of a network is the cross-entropy losses of labeled data and unlabeled data.

$$L_p = \frac{1}{n}\sum_{m=1}^{n}\sum_{i=1}^{C} \mathbb{E}(y_i^m, f_i^m) + \alpha(t)\frac{1}{n'}\sum_{m=1}^{n'}\sum_{i=1}^{C} \mathbb{E}(y_i'^m, f_i'^m) \quad \text{(Eq. 1)}$$

Where n is the number of labeled training data per minibatch if SGD is used. n' is the number of unlabeled data per mini-batch. C is the number of classes. $E(y_i^m, f_i^m)$ is the cross-entropy between true label and inference result for labeled data. $E(y'_i^m, f'_i^m)$ is the cross-entropy between pseudo label and inference result for unlabeled data sample m for class i (Pseudo label and true label are both one hot vector, thus $y_i^m$ and $y'_i^m$ are either 1 or 0). $\alpha(t)$ is a rampup function to determine the contribution of unlabeled data for the network. Since the inference result of unlabeled data is not accurate in the initial stage of training, $\alpha(t)$ is set to zero. It then increases gradually as the network gains more knowledge from the labeled samples. The former part of the loss function is a supervised loss for labeled data and the latter one is the unsupervised loss for unlabeled data. However, the quality of the pseudo label relies on the quality of the network model. Meanwhile, the pseudo label will eventually impact the quality of the network as well. If wrong pseudo labels are incorporated with labeled samples during the training process, the model error will be exacerbated as the ramp-up index increases.

To make the prediction of pseudo labels more robust, self-ensembling training has been proposed to develop multiple child models with diverse variants from a parent model. Although child models have diverse variants, their output is expected to be consistent with each other for samples in the final results. In these systems, ensemble learning is often used for the fusion of child models. The fusion of child models can smoothen the prediction of pseudo labels. Data augmentation and diverse network configuration are two widely used approaches to achieve child models having different variants of the child models.

As will be appreciated by those of skill in the art, adding random noise is the most common way for data augmentation. The diversity between child models' variants can be considered as the difference between features extracted from data without noise and features extracted from data with noise. Fusion of child models must make sure the views of data without noise and data with noise are consistent with each other. In this case, it will force the network to denoise data samples and extract more features than a network without data augmentation. In some models, proposed ladder networks (a nested autoencoder) are used to get better prediction for the unlabeled data. These utilize two identical nested encoder networks. The clean encoder has a clean input and the corrupted encoder always adds random noise to its encoder layers. The cost function retains the supervised loss of Equation 1 for the clean encoder but considers the consistency cost (denoising cost) of each autoencoder layers of a corrupted encoder as the unsupervised loss. However, it has been found that the computation of the denoising cost of every autoencoder layers is too heavy in the training process.

Some developers further introduce diverse network configurations to produce diverse child models on training samples along with data augmentation. Network regularization techniques like "Dropout" and "DropConnect" dynamically mask a subset of the parent model during training. In this case, the dynamic parent model produces diverse child models in each epoch or step. π model utilizes two parallel same parent models with Dropout and stochastic data augmentation. For every step (every batch), their child models produce two views for unlabeled data. The fusion of child models is to minimize the consistency cost, which is the difference between the inferences of two child models. The lost function of π model is $$L_\pi = \frac{1}{n}\sum_{m=1}^{n}\sum_{i=1}^{C}\mathbb{E}(y_i^m, f_i^m) + \alpha(t)\frac{1}{n+n'}\sum_{m=1}^{n+n'}\sum_{i=1}^{C}\|f_i^m - f_i'^m\|^2 \quad (\text{Eq. 2})$$

where $f$ and $f'$ are the two parallel models sharing the same network structure with dropout and stochastic data augmentation. The supervised loss remains the same as Eq. 1. The drawback of π model is that two parallel models in the training process cost too many resources which will decrease its scalability. Temporal Ensembling utilizes only one parent model in every epoch, but it also produces a diverse child model due to Dropout in different epochs. In this case, the consistency cost in every step is the difference between the ensemble prediction/inference and the inference of the current model. Ensemble prediction is the exponential moving average (EMA) of predictions in previous epochs. The loss of a temporal model is:

$$L_t = \frac{1}{n}\sum_{m=1}^{n}\sum_{i=1}^{C}\mathbb{E}(y_i^m, f_i^m) + \alpha(t)\frac{1}{n+n'}\sum_{m=1}^{n+n'}\sum_{i=1}^{C}\|f_i^m - z_i^m\|^2 \quad (\text{Eq. 3})$$

where z is the ensemble prediction. What is more, mean teacher learning model may be used to further optimize the ensembling procedure of Temporal Ensembling. First, it updates ensemble prediction in each step rather than each epoch. The second optimization is that instead of ensembling previous predictions, mean teacher ensembles the weights of previous models. So, the consistency cost in each step becomes the distance of prediction of the current model (student model) and prediction of the ensemble model (teacher model). The loss function of the mean teacher is:

$$L_t = \frac{1}{n}\sum_{m=1}^{n}\sum_{i=1}^{C}\mathbb{E}(y_i^m, f_i^m)(x, \theta)) + \alpha(t)\frac{1}{n+n'}\sum_{m=1}^{n+n'}\sum_{i=1}^{C}\|f_i^m(x, \theta') - z_i^m(x, \theta)\|^2 \quad (\text{Eq. 4})$$

where $f_i^m(x, \theta)$ is the student model with weight (parameter) $\theta$ and $f_i^m(x, \theta')$ is the teacher model with weight (parameter) $\theta'$. And the EMA of weight in every step t is computed as follows:

$$\theta_t' \leftarrow \beta\theta_t' + (1-\beta)\theta_{t-1} \quad (\text{Eq. 5})$$

In addition, mean-only batch normalization and weight normalization are used in convolutional and SoftMax layers. However, these heuristic approaches cannot guarantee the quality of the learned model since limited labeled data are generally insufficient to initialize models to produce reliable pseudo labels for unlabeled data.

To solve the problem of limited labeled data, domain knowledge constraints are imposed to train the learned model. In some models, domain knowledge constraints are structured functions such as structural constraints or logic rules. Instead of using direct labels to regularize learned model, domain knowledge constraints provide another way to regularize the distribution of model posterior. Assume Q is a set of distribution of domain constraints with respect to the posterior of learned model.

$$Q = \{q(y):E_q|G(x,y)|\leq c\} \quad (\text{Eq. 6})$$

where G is a set of constraint functions and its expectations are bounded by c. The constraint set implies extra information on posterior's distribution and narrows down the searching space of posterior. In this case, a penalty term is defined to push posterior to the desired implicit distributions of domain knowledge constraints where KL divergence is used to measure the distance between two distributions.

$$KL(Q\|p(x,y)) = \min_{q \in Q} KL(q(y)\|p(x,y)) \quad (\text{Eq. 7})$$

However, this approach relies on the domain knowledge. Domain knowledge is proved useful to regularize the posterior. However, these works only focus on regularizing the posterior of model output (target variable) and needs dedicated constraint design before model training. The domain constraint feature set G is carefully specified by domain experts prior to the network training. So G is only suitable for a specific model which makes it difficult to be used in other applications of machine learning. What is more, G is only related to the input x and output y of learned model, which is not realistic since most physical models have multiple parameters except x and Y.

What is needed in the art is a software-defined network that exploits the interaction amongst blockchain, SDN, and weakly supervised machine learning techniques to enable a secure, intelligent, and scalable networking and monitoring system.

SUMMARY OF THE INVENTION

In one or more embodiments, the present invention provides a software-defined network that exploits the interaction amongst blockchain, SDN, and weakly supervised machine learning techniques to enable a secure, intelligent, and scalable networking and monitoring system. In one or more embodiments, the invention is directed to a blockchain secured, software-defined network and monitoring system comprising: a multi-controller software-defined network (SDN) network layer having a plurality of SDN controllers; a blockchain based security and autonomy layer comprising a blockchain database that is operatively connected with the plurality of SDN controllers and one or more computational centers; and a deep learning-driven decision making layer comprising the one or more computational centers, where the computational center is in communication with both the multi-controller software-defined network (SDN) network layer and the blockchain based security and autonomy layer. In various embodiments, the blockchain secured, software-defined network and monitoring system further comprises a horizontal data plane layer in communication with said multi-controller software-defined network (SDN) network layer and said one or more computational centers, where the horizontal data plane layer comprises a plurality of peer to peer domains each having one or more the domain switches, at least one domain edge switch, and one or more virtual machines. In some embodiments, the present invention is directed to methods for ensuring the integrity of a control command between two SDN controllers, or between a computational center of said at least one computational center and an SDS controller using the blockchain secured, software-defined network and monitoring system. In various embodiments, the present invention relates to methods for extracting useful features from said labelled and non-labelled data contained in the horizontal data plane layer in the blockchain secured, software-defined network and monitoring system In a first aspect, the present invention is directed to a blockchain secured, software-defined network and monitoring system comprising: a plurality of software-defined network (SDN) controllers and one or more computational centers, wherein each of the SDN controllers is configured to interface with: one or more SDN controller of the plurality of SDN controllers, a blockchain database via installed blockchain middleware, at least one of the one or more computational centers via installed communications middleware, and at least one peer-to-peer domain, wherein the peer-to-peer domain comprises at least one domain switch that is in communication with the SDN controller for intra-domain communication, and at least one domain edge switch, which is in communication with the SDN controller and one or more of the at least one domain switches for inter-domain communication, and wherein the plurality of SDN controllers and the one or more computational center are networked together to form a software-defined network having a horizontal controller plane layer comprising the plurality of SDN controllers, the installed blockchain middleware, and the installed communications middleware, and a horizontal data plane layer in communication with the horizontal controller plane layer and comprising the peer to peer domains, the domain switches, and domain edge switches; and a blockchain-based security and autonomy management layer comprising the blockchain database and the blockchain middleware wherein the blockchain-based security and autonomy management layer is in communication with the horizontal controller plane layer through the blockchain middleware installed on each of the plurality of controllers and the one or more computational centers. In one or more of these embodiments, at least one computational center is programmed to include a semi-supervised learning-enabled situational awareness tool for extracting useful features from data sets containing both labelled and non-labelled data. In one or more embodiments, the blockchain secured, software-defined network and monitoring system of the present invention includes any one or more of the above referenced embodiments of the first aspect of the present invention wherein the peer to peer domains further comprise a plurality of virtual IP addresses.

In one or more embodiments, the blockchain secured, software-defined network and monitoring system of the present invention includes any one or more of the above referenced embodiments of the first aspect of the present invention wherein the blockchain middleware comprises: a peer-to-peer network engine operatively connected to the horizontal controller plane layer; a consensus engine that determines the ledger structure of the blockchain architecture; a smart contract engine compiled to a virtual machine and a decentralized application (Dapp) to manage decentralized autonomous operations; a decentralized machine learning (DML) application programming interface (API) that interacts with a deep learning-driven decision-making layer; and a block database for critical and limited parameters for smart contract. In one or more embodiments, the blockchain secured, software-defined network and monitoring system of the present invention includes any one or more of the above referenced embodiments of the first aspect of the present invention wherein the blockchain middleware further comprises a decentralized off-chain encrypted storage for networking situational information and sensing data obtained for application-driven operations. In one or more embodiments, the blockchain secured, software-defined network and monitoring system of the present invention includes any one or more of the above referenced embodiments of the first aspect of the present invention wherein the networking situational information comprises local and global Quality of Service (QoS), Quality of Experience (QoE) measurements, network topologies or sensing information.

In a second aspect, the present invention is directed to a blockchain secured, software-defined network and monitoring system comprising: a multi-controller software-defined network (SDN) network layer comprising a plurality of SDN controllers; a blockchain based security and autonomy layer comprising a blockchain database that is operatively connected with the plurality of SDN controllers and one or more computational centers; and a deep learning-driven decision making layer comprising the one or more computational centers, wherein the computational center that is in communication with the multi-controller software-defined network (SDN) network layer and the blockchain based security and autonomy layer. In one or more of these embodiments, the blockchain secured, software-defined network and monitoring system further comprising a horizontal data plane layer in communication with the multi-controller software-defined network (SDN) network layer and the one or more computational centers, the horizontal data plane layer comprising a plurality of peer to peer domains each having one or more the domain switches, at least one domain edge switch, and one or more virtual machines. In one or more embodiments, the blockchain secured, software-defined network and monitoring system of the present invention includes any one or more of the above referenced embodiments of the second aspect of the present invention wherein the one or more of the virtual machines in the horizontal data plane layer contain data.

In one or more embodiments, the blockchain secured, software-defined network and monitoring system of the present invention includes any one or more of the above referenced embodiments of the second aspect of the present invention wherein the blockchain based security and autonomy layer further comprises blockchain middleware installed on each of the plurality of SDN controllers and the one or more computational center. In one or more embodiments, the blockchain secured, software-defined network and monitoring system of the present invention includes any one or more of the above referenced embodiments of the second aspect of the present invention wherein the blockchain middleware comprises: a peer-to-peer network engine operatively connected to operatively connected with the plurality of SDN controllers and the one or more computational center; a consensus engine that determines the ledger structure of the blockchain architecture; a smart contract engine compiled to a virtual machine and a decentralized application (Dapp) to manage decentralized autonomous operations; a decentralized machine learning (DML) application programming interface (API) that interacts with a deep learning-driven decision-making layer; and a block database for critical and limited parameters for smart contract. In one or more embodiments, the blockchain secured, software-defined network and monitoring system of the present invention includes any one or more of the above referenced embodiments of the second aspect of the present invention wherein the blockchain middleware further comprises a decentralized off-chain encrypted storage for networking situational information and sensing data obtained for application-driven operations.

In a third aspect, the present invention is directed to a method for ensuring the integrity of a control command between two SDN controllers, or between a computational center of the at least one computational center and an SDS controller, in the blockchain secured, software-defined network and monitoring system described above comprising: generating a first control signal in a first SDN controller or computational center, the control signal comprising a time stamp and control message data; generating a first hash value for the time stamp and a second hash value for the control message data and combining them to form a sent control signal hash value; saving the sent control signal hash value to the blockchain database via the blockchain middleware; and confirming that a control signal received by a second SDN controller or computational center is the first control signal by: generating hash values for the time stamp and the control message data of the received control signal and combing them to form a received control signal hash value, and comparing the received control signal hash value to the sent control signal hash saved on the blockchain database to confirm that the control signal received by a second SDN controller or computational center is the first control signal.

In one or more embodiments, the method for ensuring the integrity of a control command between two SDN controllers of the present invention includes any one or more of the above referenced embodiments of the third aspect of the present invention wherein the step of generating a first control signal in a first SDN controller or computational center comprises: collecting network statistics or data from one or more of the plurality of software-defined network (SDN) controllers or the horizontal data plane layer and transmitting the network statistics or data to at least one of the one or more computational center; and generating a first control signal based upon the collected network statistics or data. In one or more of these embodiments, the network statistics or data are collected and transmitted according to parameters programmed into a smart contract in the blockchain-based security and autonomy management layer. In one or more embodiments, the method for ensuring the integrity of a control command between two SDN controllers of the present invention includes any one or more of the above referenced embodiments of the third aspect of the present invention wherein first control signal is generated according to one or more parameters programed into a smart contract in the blockchain-based security and autonomy management layer from the collected network statistics or data.

In a fourth aspect, the present invention is directed to a method for extracting useful features from the labelled and non-labelled data contained in the horizontal data plane layer in the blockchain secured, software-defined network and monitoring system described above comprising: constructing a blockchain secured, software-defined network and monitoring system as described above; generating a first control signal in the deep learning-driven decision making layer requesting data contained in the horizontal data plane layer, wherein the first control signal comprises a time stamp and control signal data and the requested data contains both labelled and non-labelled data; generating a first hash value for the time stamp and a second hash value for the control signal data; and combining the first and second hash values to form a sent control signal hash value, which is saved in the blockchain based security and autonomy layer; broadcasting the first control signal to one or more of the plurality of SDN controllers, wherein the requested data is collected by the plurality of SDN controllers and transmitted to at least one of the one or more control centers in the deep learning-driven decision making layer, wherein each of the one or more of the plurality of software-defined network (SDN) controllers that receives a control signal generates a third hash value for the time stamp of the received control signal and a fourth hash value for the received control signal data, combines them to form a received control signal hash value; and then verifies the authenticity of the received control signal by comparing the received control signal hash value to the sent control signal hash value saved in the blockchain based security and autonomy layer; collecting the requested data from the horizontal data plane layer and transmitting it to one or more of the one or more computational centers; and extracting useful features from the requested data using the semi-supervised learning-enabled situational awareness tool in the deep learning-driven decision making layer. In one or more of these embodiments, the requested data comprises Quality of Service (QoS) measurements, Quality of Experience (QoE) measurements, network topologies or sensing information. In one or more embodiments, the method for extracting useful features from the labelled and non-labelled data of the present invention includes any one or more of the above referenced embodiments of the fourth aspect of the present invention wherein the useful features comprise domain knowledge and features presented by the data.

In one or more of these embodiments, the step of extracting useful features from the labelled and non-labelled data comprises: providing a knowledge domain-enabled hybrid semi-supervised learning-enabled situational awareness tool comprising a primary neural network having a first layer, multiple dropout layers, a last layer and a second to last layer, secondary neural network having a first layer, multiple dropout layers, and a last layer, and a latent-feature neural network having a first layer and a last layer, wherein the latent-feature neural network with dropout received data input from the second to last layer of the primary neural network; generating a data set having both labelled and unlabeled data and transmitting the data set to the first layer of the primary neural network and the first layer of the secondary neural network; transmitting the data from the second to last layer of the primary neural network to the first layer of the latent-feature neural network; generating a first loss function comprising the output of the last layer of the primary neural network and a second data set comprising labels; generating a second loss function comprising the output of the last layer of the primary neural network and the output of the last layer of the secondary neural network; generating a third loss function comprising the output of the last layer of the latent-feature neural network; combing the first loss function, the second loss function, and the third loss function to arrive an accumulative loss function; back propagating the data set; and repeating the previous steps to extract the useful features from the data. In one or more of these embodiments, the method further comprises stochastic augmentation of the data set prior to the step of transmitting the data set to the first layer of the primary neural network and the first layer of the secondary neural network.

BRIEF DESCRIPTION OF THE DRAWINGS

For a more complete understanding of the features and advantages of the present invention, reference is now made to the detailed description of the invention along with the accompanying figures in which:

FIG. 10 is an Algorithm for semi supervision via domain knowledge distillation according to one or more embodiments of the blockchain secured, software-defined network and monitoring system of the present invention;

FIG. 11 is a graph showing comparative error rates for proof-of-concept of experiments done using an embodiment of the hybrid semi-supervised learning-based system of the present invention and using a prior art semi-supervised learning-based system;

DETAILED DESCRIPTION OF THE ILLUSTRATIVE EMBODIMENTS

Figure 1:
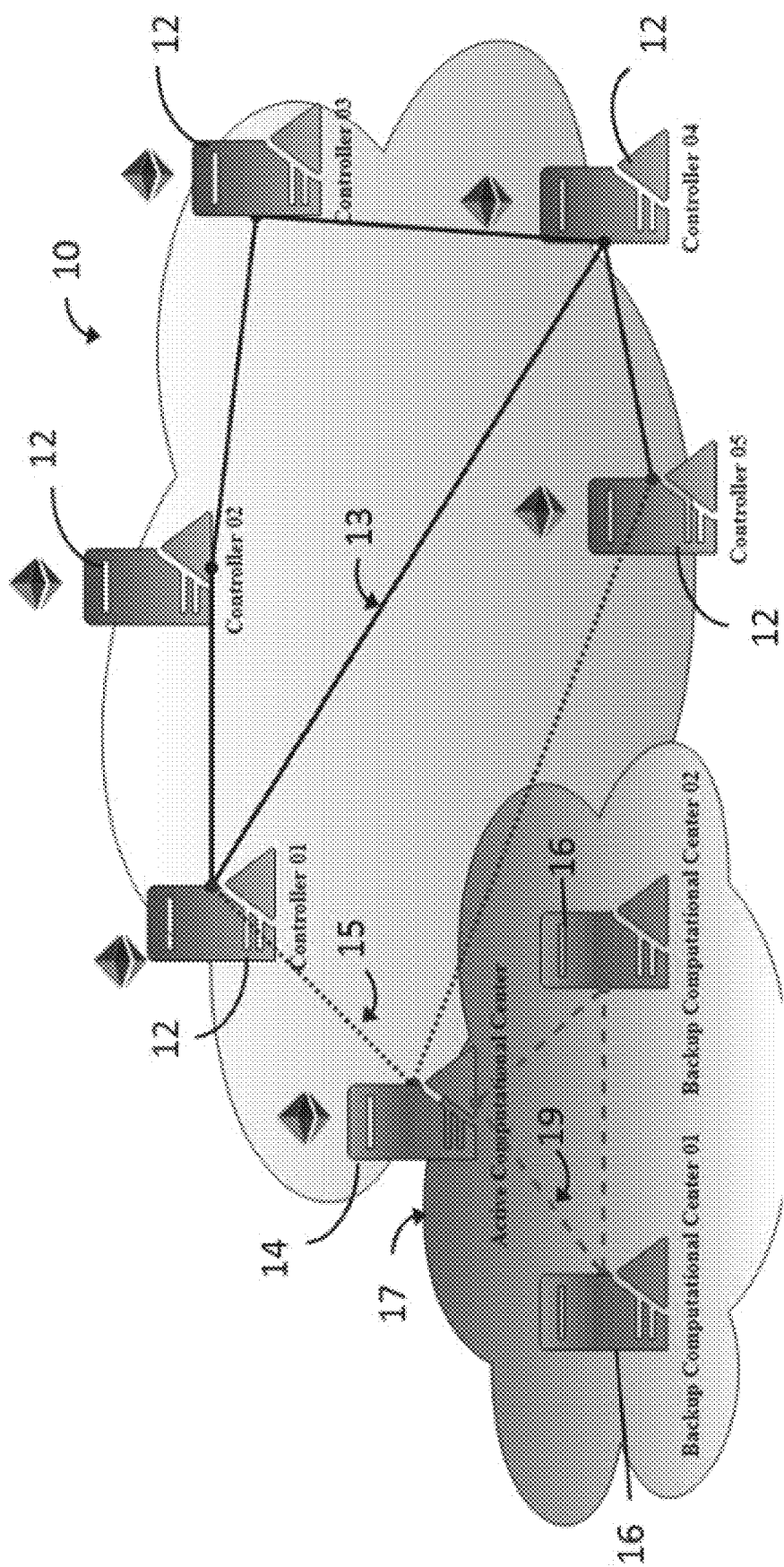
FIG. 1 is a schematic overview of the monitoring and networking infrastructure according to one or more embodiments of the blockchain secured, software-defined network and monitoring system of the present invention.

The following is a detailed description of the disclosure provided to aid those skilled in the art in practicing the present disclosure. Those of ordinary skill in the art may make modifications and variations in the embodiments described herein without departing from the spirit or scope of the present disclosure. Unless otherwise defined, all technical and scientific terms used herein have the same meaning as commonly understood by one of ordinary skill in the art to which this disclosure belongs. The terminology used in the description of the disclosure herein is for describing particular embodiments only and is not intended to be limiting of the disclosure.

As set forth above, Software-Defined Networking (SDN) is a promising technology, which removes the control plane from individual switches and transfers it to a centralized controller that has the complete topological view of the network that is available to all the switches in the network. SDN has gained widespread popularity due to its high controllability and low operation cost. However, there still remain essential challenges of implementing SDN such as the scalability and security of the control plane. Additionally, although blockchain is an emerging technology to enable secure and distributed data analysis and communications, the conventional networking infrastructure does not provide the effective and resilient peer-to-peer (P2P) networking functionality. Finally, these systems have not been successfully combined with weakly supervised machine learning techniques for extracting useful features from labelled and non-labelled data contained in the blockchain secured, software-defined network and monitoring system. To address these challenges, the present invention exploits the interaction of blockchain, SDN, and weakly supervised machine learning techniques to enable a secure, intelligent, and scalable networking and monitoring system, sometimes referred to herein as 3S-Chain.

In one or more embodiments, the invention is directed to a blockchain secured, software-defined network and monitoring system comprising: a multi-controller software-defined network (SDN) network layer having a plurality of SDN controllers; a blockchain based security and autonomy layer comprising a blockchain database that is operatively connected with the plurality of SDN controllers and one or more computational centers; and a deep learning-driven decision making layer comprising the one or more computational centers, where the computational center is in communication with both the multi-controller software-defined network (SDN) network layer and the blockchain based security and autonomy layer. In various embodiments, the blockchain secured, software-defined network and monitoring system further comprises a horizontal data plane layer in communication with said multi-controller software-defined network (SDN) network layer and said one or more computational centers, where the horizontal data plane layer comprises a plurality of peer to peer domains each having one or more the domain switches, at least one domain edge switch, and one or more virtual machines. In some embodiments, the present invention is directed to methods for ensuring the integrity of a control command between two SDN controllers, or between a computational center and an SDS controller using the blockchain secured, software-defined network and monitoring system. In various embodiments, the present invention relates to methods for extracting useful features from the labelled and non-labelled data contained in the horizontal data plane layer in the blockchain secured, software-defined network and monitoring system.

The following terms may have meanings ascribed to them below, unless specified otherwise. As used herein, the terms "comprising" "to comprise" and the like do not exclude the presence of further elements or steps in addition to those listed in a claim. Similarly, the terms "a," "an" or "the" before an element or feature does not exclude the presence of a plurality of these elements or features, unless the context clearly dictates otherwise. Further, the term "means" used many times in a claim does not exclude the possibility that two or more of these means are actuated through a single element or component.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein in the specification and the claim can be modified by the term "about."

It should be also understood that the ranges provided herein are a shorthand for all of the values within the range and, further, that the individual range values presented herein can be combined to form additional non-disclosed ranges. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50.

Further, the following acronyms and abbreviations may be used herein: ADMM (alternating direction method of multipliers); API (application programming interface); ARP (Address Resolution Protocol); Dapp (Decentralized application); DML (decentralized machine learning); EM (Expectation Maximization); EMA (Exponential Moving Average); GAN (Generative Adversarial Network); ISP (Internet Service Provider); P2P (Peer-to-peer); PMU (phasor measurement unit); PoA (Proof of Authority); PoS (Proof of Stake); PoW (Proof of Work); QoE (Quality of Experience); QoS (Quality of Service); SDN (Software-Defined Networking); SNMP (Simple Network Management Protocol); UDP (User Datagram Protocol); VM (virtual machine); and VRRP (Virtual Router Redundancy Protocol).

All publications, patent applications, patents, and other references mentioned herein are expressly incorporated by reference in their entirety, which means that they should be read and considered by the reader as part of this text. That the document, reference, patent application, or patent cited in this text is not repeated in this text is merely for reasons of conciseness. In the case of conflict, the present disclosure, including definitions, will control. All technical and scientific terms used herein have the same meaning.

Further, any compositions or methods provided herein can be combined with one or more of any of the other compositions and methods provided herein. The fact that given features, elements or components are cited in different dependent claims does not exclude that at least some of these features, elements or components maybe used in combination together.

In a first aspect, the present invention is directed to a blockchain secured, software-defined network and monitoring system generally configured as shown in FIGS. 1-4. In one or more embodiments, the blockchain secured, software-defined network and monitoring system 10 will comprise: a plurality of SDN controllers 12 forming a multi-controller software-defined network (SDN) network layer 18; a blockchain based security and autonomy layer 30 comprising a blockchain database 40 that is operatively connected with the SDN controllers 12 and one or more computational centers 14,16; and a deep learning-driven decision making layer 60 comprising one or more computational centers 14, 16, where the active computational center 14 is in communication with both the multi-controller software-defined network (SDN) network layer 18 and the blockchain based security and autonomy layer 30, as shown in FIGS. 1-4. In some embodiments, the blockchain secured, software-defined network and monitoring system of the present invention will also comprise a horizontal data plane layer 50 in communication with said multi-controller software-defined network (SDN) network layer 18 by southbound control lines 21. In various embodiments, the horizontal data plane layer 50 will comprise a plurality of interconnected peer to peer domains 24, each having one or more the domain switches 52, at least one domain edge switch 54, and one or more virtual machines 56.

Figure 2:
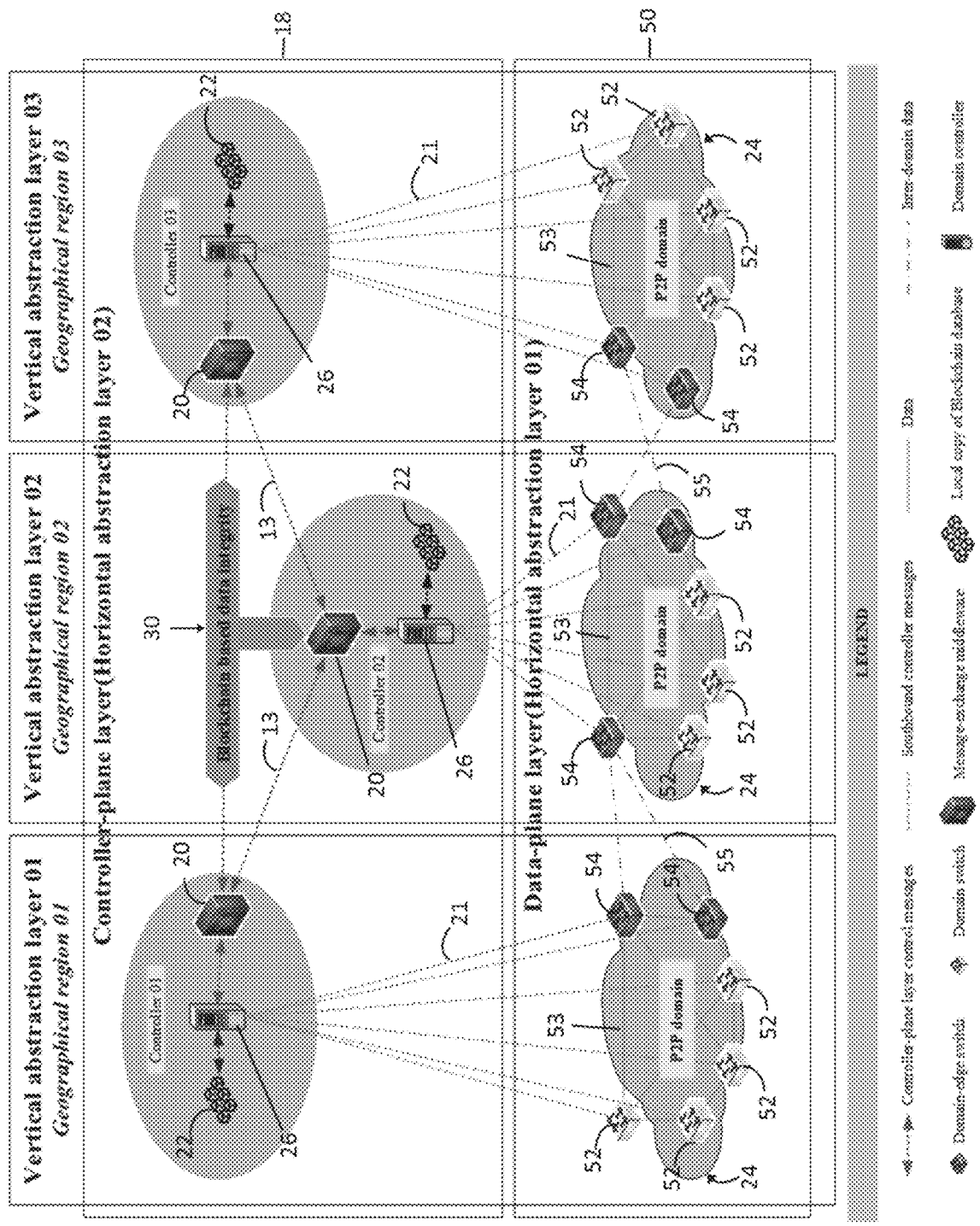
FIG. 2 is a schematic diagram showing a multi-controller SDN networking layer according to various embodiments of the blockchain secured, software-defined network and monitoring system of the present invention.

FIG. 1 provides a schematic overview of monitoring and networking infrastructure according to one or more embodiments of the blockchain secured, software-defined network and monitoring system of the present invention. In one or more embodiments, the monitoring and networking infrastructure 10 shown in FIG. 1 includes a plurality of software-defined network (SDN) controllers 12 and one or more computational centers 14, 16 networked together substantially as shown in FIG. 1. Each of said SDN controllers 12 is configured to interface with: (i) one or more other SDN controllers 12, via controller-controller communications lines 13; (ii) a blockchain based security and autonomy layer 30, via installed blockchain middleware 20, (iii) one or more computational centers 14, 16, via installed communications middleware 20 running through controller-computational center lines 15 or blockchain middleware 22; and (iv) a peer-to-peer domain 24, via southbound control lines 21, as shown in FIGS. 1 and 2.

The specific mechanism for connection the controllers 12, computational centers 14, 16, blockchain database, and peer to peer domains 24 are not particularly limited and any suitable means and/or protocol may be used. In various embodiments, controller-controller communications line 13, controller-computational center line 15, and southbound control lines 21 may be any suitable wired or wireless connection. In some embodiments, controller-controller communications line 13 may be a user datagram protocol (UDP) socket connection or Transmission Control Protocol (TCP) socket connection. In some embodiments, UDP socket connections are used for controller-to-controller communication during normal operation. In one or more embodiments, controller-computational center line 15 may be a UDP socket connection or a TCP socket connection. In some embodiments, southbound control lines 21 may be wired/wireless communications enabled by—southbound protocols, such as OpenFlow™ (Open Networking Foundation (ONF), Menlo Park, CA), NETCONF (RFC 6241); P4 Runtime (P4.org's API working group) or Simple Network Management Protocol (SNMP) (Internet Engineering Task Force (IETF), Fremont, CA).

The number of SDN controllers 12 networked into monitoring and networking infrastructure 10 is not particularly limited and any number of SDN controllers 12 may be used. In some embodiments, monitoring and networking infrastructure 10 of software-defined network and monitoring system will have from 2 to about 1000 SDN controllers. SDN controllers 12 are networked together via a series of controller-controller communications lines 13, as shown in FIGS. 1 and 2, and described above.

In various embodiments, each SDN controller 12 will be contain at least one computer, controller, microcontroller, microprocessor, server, or other piece of logic-based computing equipment capable of running suitable message-exchange middleware, suitable blockchain middleware, and other SDN related protocols. While they certainly could, it is not necessary that the SDN controllers 12 have a high degree of computational power. That being said however, SDN controllers 12 should have sufficient computing power to run suitable message-exchange and blockchain middleware 20, 22, send and receive messages from the other SDN controllers 12, make decisions regarding network management, conduct security verification with the blockchain based security and autonomy layer 30, and implement other functionalities to enhance network intelligence and resilience. In some embodiments, one or more of the SDN controller may also contain memory and a computer processing unit (CPU).

As set forth above, controllers 12 are networked together with at least one computational center to from the horizontal multi-controller software-defined network (SDN) network layer (also referred to herein as "controller-plane layer" or "horizontal controller-plane layer") 18. In some embodiments, when a controller 12 is connected to one or more neighboring controller, it will generate a layer 2 packet encapsulating its IP address and will send it through all of its outbound interfaces. Any controller 12 receiving these packets will be able to determine the first controller IPs and how it is connected to that controller (i.e., through which switches). Each controller 12 will communicate this information with other controllers in the controller plane layer using UDP sockets and from the information it receives determine the complete controller network graph that presents the networking topology and environment.

Figure 3:
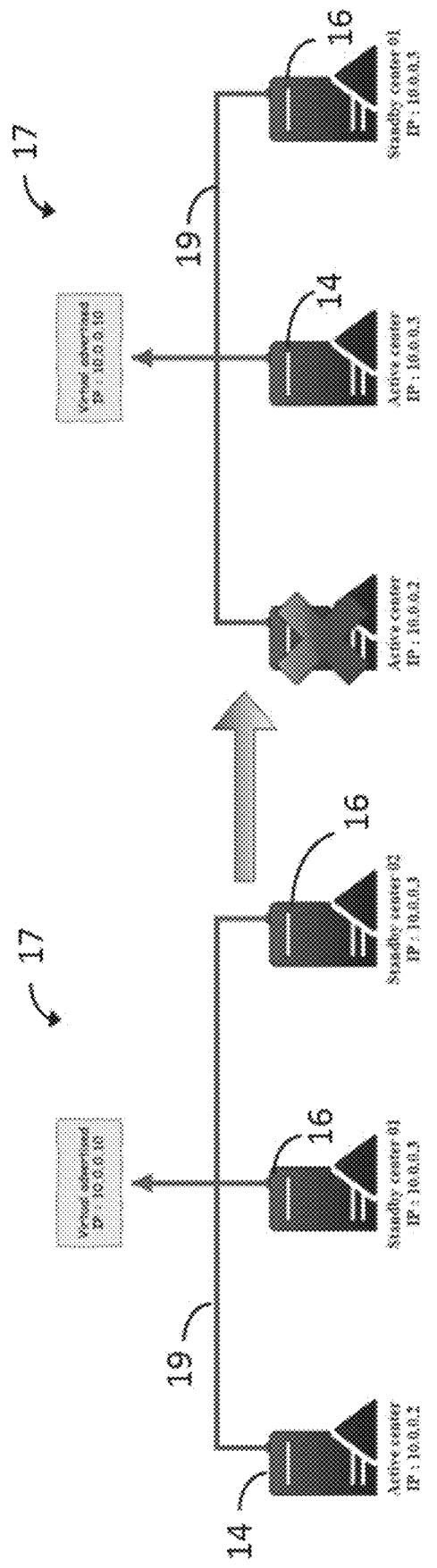
FIG. 3 is a schematic diagram showing an active computational center election process according to one or more embodiments of the blockchain secured, software-defined network and monitoring system of the present invention.
Figure 4:
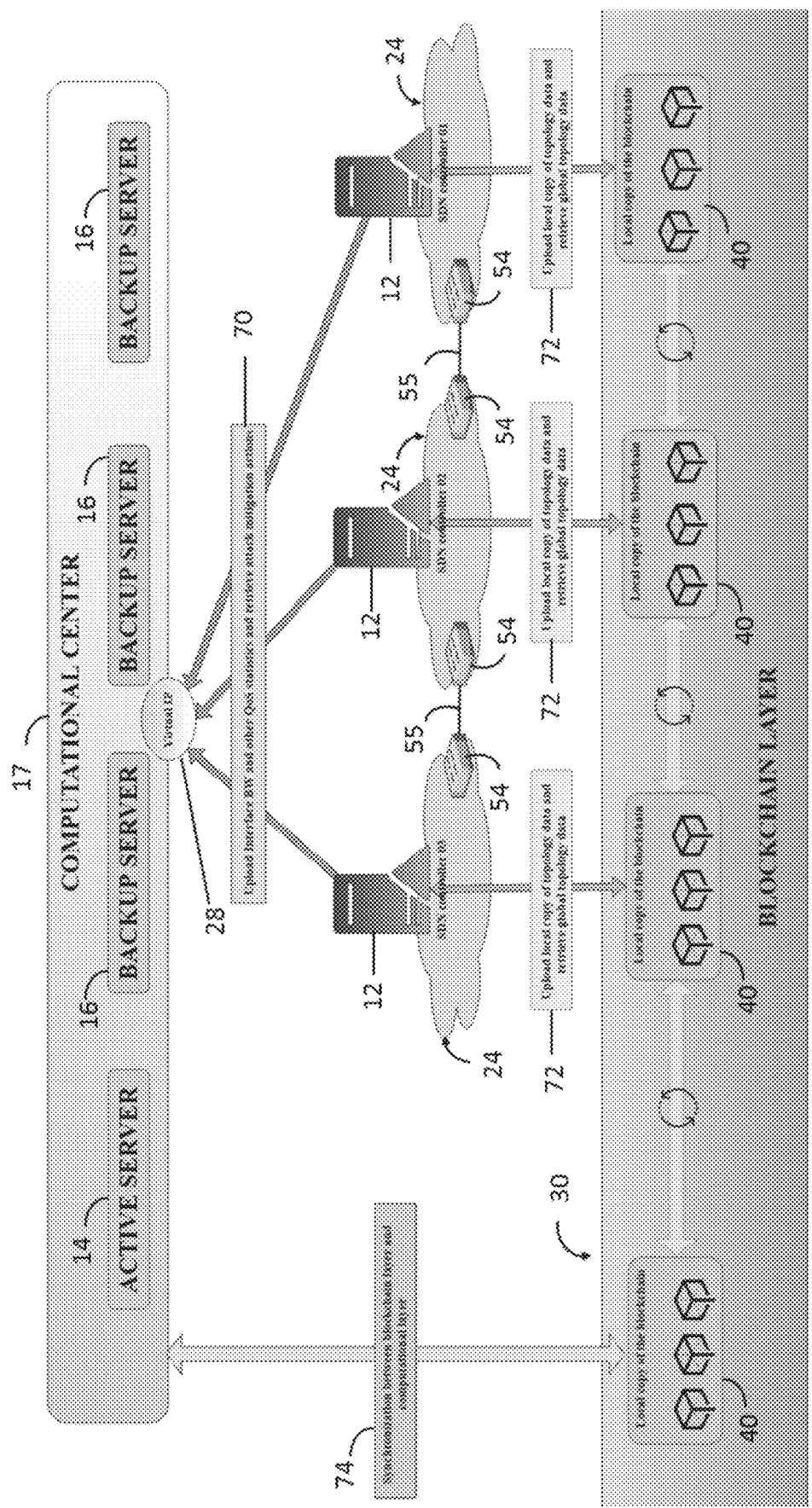
FIG. 4 is a schematic diagram illustrating the functionalities of the computational centers and their interaction with the SDN controllers according to one or more embodiments of the blockchain secured, software-defined network and monitoring system of the present invention.

In one or more embodiments, the monitoring and networking infrastructure 10 shown in FIGS. 1, 3, and 4 includes at least one active computational center 14 and one or more backup computation centers 16 connected through computational center-computational center communication line 19. Computational centers 14, 16 are deployed in the controller-plane layer 18 to effectively carry out heavier computational tasks (compared with the tasks implemented in the SDN controllers 12) for networking and monitoring operations while adding deep learning-based intelligence to the network as shown in FIG. 3. In various embodiments, computational centers 14, 16 proactively support controllers 12 by continuously monitoring controller traffic and implementing mitigation actions amidst anomalies. In one or more embodiments, computational centers 14, 16 help controllers to manage traffic using by predicting traffic and identifying paths less vulnerable to future congestion and to detect and mitigate the potential cyber attacks.

In some embodiments, multiple computational centers 14,16 are activated simultaneously in the network to increase redundancy. In some embodiments, the monitoring and networking infrastructure 10 will include a computational center cluster 17 containing at least one active computational center 14 and one or more backup computation centers 16, as shown in FIGS. 1, 3, and 4. In some of these embodiments, the active computational center 14 can be found by a Virtual Router Redundancy Protocol (VRRP) 28 designed to implement an active computational center election process amidst an active center failure, or other predetermined criteria such as resilience optimization. Further, in these embodiments, the virtual IP of the computational cluster 17 is known to all the controllers 12, as it was broadcasted in the beginning of the network. (See FIGS. 1, 3).

In various embodiments, each computational center 14, 16 will be contain at least one computer, controller, microcontroller, microprocessor, server, or other piece of logic-based computing equipment capable of running, at least, suitable message-exchange middleware, suitable blockchain middleware, and decentralized data storage. In various embodiments, computational centers 14, 16 will have sufficient computing power to run suitable message-exchange and blockchain middleware 20, 22, send and receive messages to/from SDN controllers 12, and make decisions on networking management. In some embodiments, one or more of the computational centers 14, 16 will also contain memory. In one or more embodiments, each one of the plurality of computational centers 14, 16 may be, without limitation, an embedded GPU device or single-board computer.

In one or more embodiments, computational centers 14, 16 provide computational intelligence by governing the traffic flow and cyber-attack detection/mitigation in the controller layer. In some of these embodiments, computational centers 14, 16 function as a big data analysis and data mining platforms, whose security is enforced via interacting with blockchain-based security and autonomy management layer 30 and segregate computational power among computational centers 14, 16. In one or more embodiments, at least one computational center 14 is programmed to include a hybrid semi-supervised learning-enabled situational awareness tool for extracting useful features from data sets containing both labelled and non-labelled data.

FIG. 4 illustrates the functionalities of the computational centers and their interaction with SDN controllers 12 and blockchain layer 30 according to one or more embodiment of the present invention. In these embodiments, the SDN controllers 12 send interface bandwidth and other Quality of Service (QoS) and/or Quality of Experience (QoE) statistics in pre-defined regular intervals to the computational centers 14, 16 (step 70) which can be realized via installing an SNMP or a SYSLOG agent (messages can be sent in the form of SNMP traps or SYSLOG messages). In some embodiments, an active server 14 in computational center 17 will query statistics from SDN controllers 12 via SNMP (not shown). In some embodiments, SDN controllers will send statistics to the computational center 17 via SYSLOG. In one or more of these embodiments, the SDN controllers 12 will also synchronize its topology data with the network through the blockchain layer 30 (step 72). As will be apparent, the topology data will comprise the network topology, including networking connectivity and the networking states. In these embodiments, the local copy of the topology data is uploaded to the blockchain layer 30 where it is synchronized with the global topology data stored in the blockchain layer 30 and the updated global topology data is retrieved and stored in the SDN controller 12.

Once the controller statistics are received, the associated active computational centers 14 implement a sequence of tasks, including, but not limited to: predicting the link status on the network (e.g. QoS/QoE parameters of the link) up to reasonable future based on the statistics of the network; conducting anomaly detection of the network behavior based on the received statistics; collecting the information about the affected controllers in the network; carrying out data-driven diagnostic procedures of the detected anomaly behaviors; updating the blockchain with recently calculated weights of the network; and continuously comparing the most recently prediction on QoS/QoE parameters with the actual QoS parameters of the network and recalculating the weights if the predicted values deviate over a certain percentage of the actual values.

In one or more of these embodiments, the computational center 14 are active throughout the entire operation, continually collecting/analyzing the data it receives to identify whether there are any anomalies in the SDN controllers 12, any potential infected controller ports, or any other system anomaly. In some embodiments, the active computational centers 14 will also route traffic based on predicted less congested paths. In one or more embodiments, computational centers 14 are also responsible for proactive mitigation of any threats by shutting down or limiting traffic across ports that are compromised, not performing properly, or not configured to handle the necessary traffic. In various embodiments, computational center 14 traffic will be routed to and from the data plane layer 50 via controllers 12. (See FIG. 2). In various embodiments, the active data computational centers 14 will be synchronized with blockchain layer 30 (step 74). (See FIG. 4)

In one or more embodiments, some or all of the computing power in each SDN controller 12 is provided by controller 26. (See, FIG. 2) As will be apparent, controller 26 may be any suitable computer, controller, microcontroller, microprocessor, server, or other piece of computing equipment capable of storing, loading and running message-exchange middleware 20 and blockchain middleware 22. While it certainly could, it is not necessary that controller 26 have a high degree of computational power. That being said however, controller 26 should have sufficient computing power to store, load and run message-exchange middleware 20 and blockchain middleware 22, send and receive messages from the other controller 26, and make decisions on networking management. In some embodiments, one or more of the controllers 26 may also contain memory and a CPU.

As set forth above, the controllers 26 of all of the SDN controllers and at least one active computational center 14 comprising the various embodiments of the software-defined network and monitoring system of the present invention are networked together using message-exchange middleware 20 installed upon these devices to form a horizontal multi-controller software-defined network (SDN) network layer 18.

Message-exchange middleware 20 is not particularly limited and may be any conventional networking software used to form SDN networks capable of being stored, loaded, and run by SDN controllers 12 and at least one active computational center 14 and, optionally, one or more backup computational centers 16. In the embodiment shown in FIG. 2, the message-exchange middleware 20 is installed on, and run by, domain controller 26. Suitable message-exchange middleware 20 may include, but is not limited to, data management and communication software, application programming interface, or a combination thereof.

As set forth above, SDN controllers 12 and at least one active computational center 14 are also networked together by a blockchain based security and autonomy layer 30 implemented through blockchain middleware 22 installed upon these devices. Blockchain middleware 22 is not particularly limited and may be software for running any conventional blockchain platform used with SDN networks that has smart contract functionality, and is capable of being stored, loaded, and run by SDN controllers 12 and at least one active computational center 14. In some embodiments, the blockchain platform may be Ethereum™ (Ethereum Foundation, Zug, Switzerland), Ethereum™ Classic, EOS (block.one, Arlington VA), DFINITY (DFINITY, Zug, Switzerland), or Hyperledger™ (The Linux Foundation, San Francisco, CA), all of which have engines and languages for implementing/executing smart contracts. In some embodiments, the blockchain platform is the Ethereum™ platform. The Ethereum platform is an open-source, public, blockchain-based distributed computing platform and operating system featuring smart contract functionality. In these embodiments, the necessary software for running the Ethereum platform, including the engine Ethereum™ Virtual Machine (EVM) and language Solidity used to generate the smart contracts, will be installed on all participating SDN controllers 12 and active computational center 14.

Figure 5:
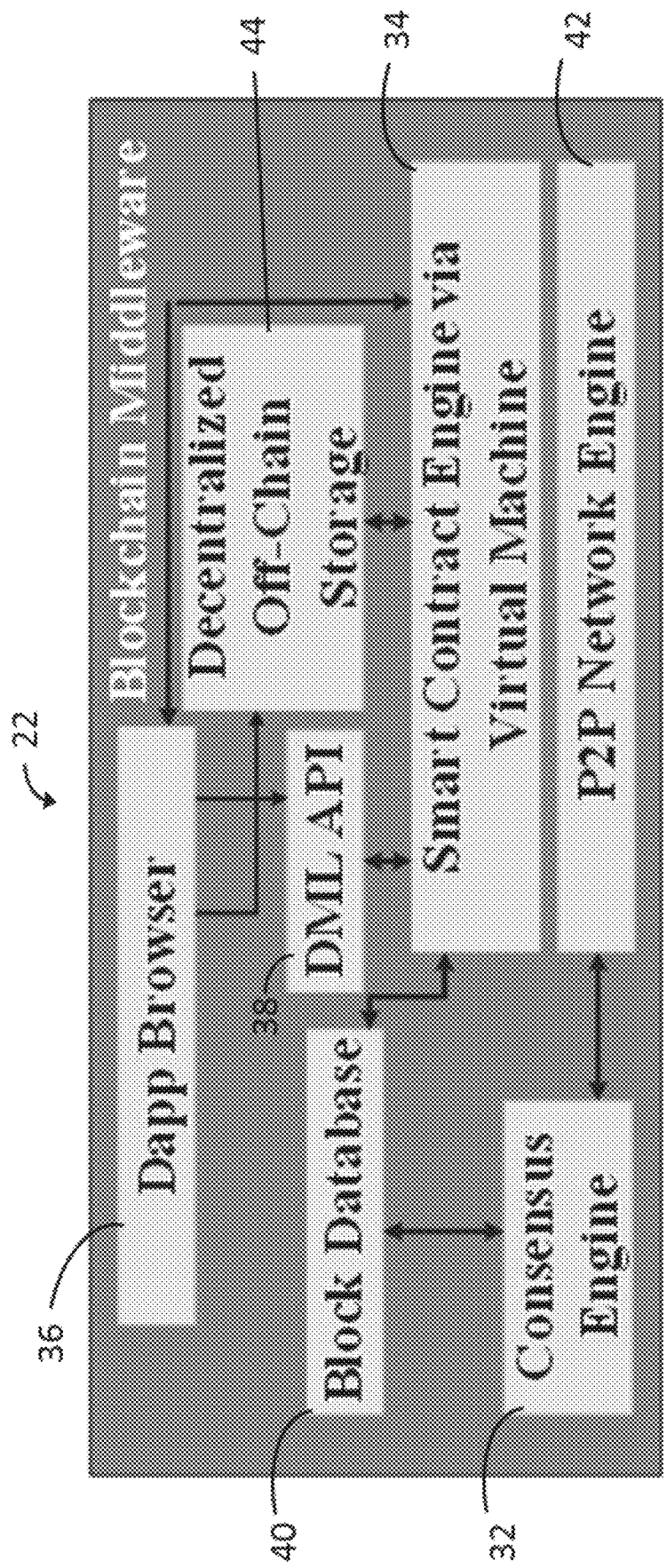
FIG. 5 is a schematic diagram identifying the components of a blockchain middleware according to one or more embodiments of the blockchain secured, software-defined network and monitoring system of the present invention.

In the embodiments shown in FIG. 5, blockchain middleware 22 will comprise: a peer-to-peer network engine operatively connected to the horizontal controller-plane layer 18; a consensus engine 32 that determines the ledger structure of the blockchain architecture; a smart contract engine 34 compiled to a virtual machine 56 and a decentralized application (Dapp) browser 36 to manage decentralized autonomous operations; a decentralized machine learning (DML) application programming interface (API) 38 that interacts with a deep learning-driven decision-making layer; a block database 40 for critical and limited parameters for smart contract, a peer to peer (P2P) network engine 42 for providing interaction with controller-plane layer 18 and data plane layer 50, and, optionally, a decentralized off-chain encrypted storage 44 for networking situational information and sensing data obtained for application-driven operations.

Consensus engine 32 is an important part of blockchain economic design and determines the ledger structure of the blockchain architecture by verifying new transactions before adding them to blocks. As will be appreciated, consensus algorithms provide incentives for miners or verifiers in order to advocate them to do what is correct for the blockchain ecosystem such as being online and verifying transaction faithfully. The incentive could be monetary, such as the mining cryptocurrency reward in Proof of Work (PoW) and guarding their stakes in Proof of Stake (PoS). In some other embodiments, the incentive could be non-financial, such as maintaining a positive reputation in Proof of Authority (PoA).

In various embodiments, the smart contract engine 34 is a computer protocol design to facilitate, verify and enforce predesigned performance, such as Etherium™ smart contract (Ethereum Foundation, Zug, Switzerland), Hyperledger™ Fabric smart contract (The Linux Foundation, San Francisco, CA) and Hyperledger™ Fabric with Chaincode (The Linux Foundation, San Francisco, CA).

In some embodiments, the decentralized application (Dapp) 36 is a decentralized application that runs on nodes in a blockchain network 30, such as Ethereum™, that may be used to create and deploy smart contracts, to check account balances, and to transfer blockchain currency, among other things.

In one or more embodiments, the DML API 38 may be an application programming interface (API) enables decentralized machine learning on edge devices. Suitable examples may include, without limitation, Federated Learning API (TensorFlow Federated (Google), Mountain View, CA).

In some embodiments, the block database 40 is a data storage in blockchain. Suitable examples may include, without limitation, ETHERIUM™ smart-contract storage (Ethereum Foundation, Zug, Switzerland).

In one or more embodiments, the peer to peer (P2P) network engine 42 is a P2P networking management protocol. Suitable examples may include, without limitation, software defined network (SDN)-enabled P2P network engine.

In one or more embodiments, the blockchain middleware 22 further comprises a decentralized off-chain encrypted storage 44 for networking situational information and sensing data obtained for application-driven operations. In various embodiments, the decentralized off-chain encrypted storage 44 is a blockchain-enabled decentralized storage system. Suitable examples may include, without limitation, InterPlanetary File System (IPFS)-powered distributed file system.

Figure 6:
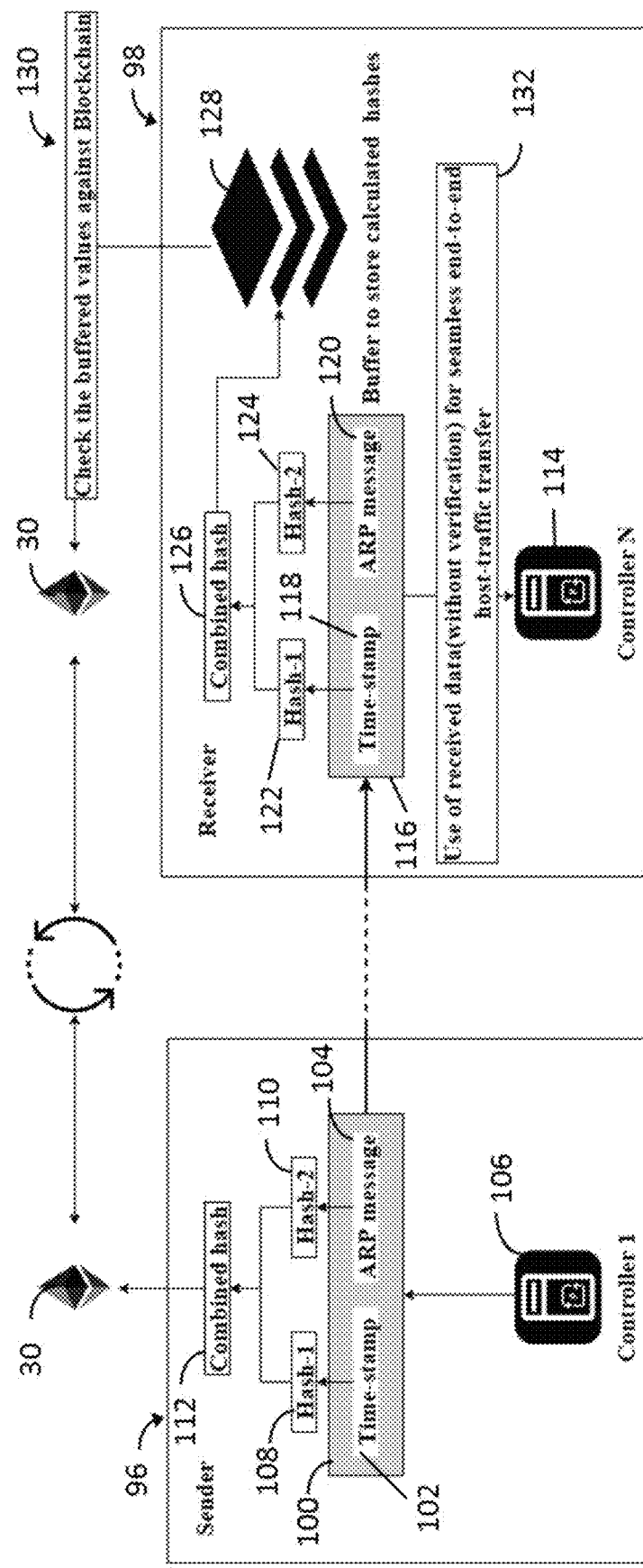
FIG. 6 is a schematic diagram illustrating the interaction of the blockchain-based security layer with the autonomy management layer according to one or more embodiments of the blockchain secured, software-defined network and monitoring system of the present invention.

In various embodiments, blockchain based security and autonomy layer 30 secures the control commands sent from/to the SDN controllers 12 and enables the secure, autonomous, and decentralized cooperation among active computational centers 14 and/or SDN controllers 12. In some embodiments, blockchain based security and autonomy layer 30 secures the control commands sent from/to the SDN controllers 12 as shown in FIG. 6. In these embodiments, an original control signal 100 having a time stamp 102 and control message data 104 ("ARP message") is generated in a SDN controller or active computational center ("Controller 1" 106 in FIG. 6). A hash value 108 ("Hash 1") is generated for the time stamp 102 and a second hash value 110 ("Hash 2") is generated for the control message data 104. These are then combined to form a hash value unique to the original control signal (original "Combined hash" 112), which is saved to the blockchain database 40 in blockchain based security and autonomy layer 30. The original control signal 100 is then transmitted to a second SDN controller 114 ("Controller N"). The second SDN Controller 114 essentially repeats the process to confirm the authenticity of the control signal. The second SDN Controller 114 receives a control signal 116 through controller-plane layer 18 having a time stamp 118 and control message data 120 ("ARP message"), generates hash values 122, 124 for each and combines them to form a combined hash value 126 (received "combined hash") unique to the control message that was received. The message 116 received by the second SDN controller 114 ("Controller N") an then be authenticated by comparing received "combined hash" 126 to the original "combined hash" 112 saved in the blockchain database 40 in blockchain based security and autonomy layer 30 (step 130). In some embodiments, the received "combined hash" may be saved in a buffer 130 for later comparison with the original "combined hash" 112 in the blockchain database (step 130) to allow seamless end-to-end host traffic transfer (step 132). In some other embodiments, In one or more of these embodiments, the control signals may be generated in a SDN controller or computational center based as follows. First, networking situational information, network statistics and/or data are collected and transmitted according to parameters programmed into a smart contract in blockchain-based security and autonomy management layer 30. The types of networking situational information, network statistics and/or data that may be collected and transmitted will depend upon the particulars of the network and the smart contract, and may include networking situational information, network statistics and/or data collected from other SDN controllers 12 and/or horizontal data plane layer 50. In some embodiments, the networking situational information, network statistics and/or data collected and transmitted comprises local and global Quality of Service (QoS) or Quality of Experience (QoE) measurements taken in the controller-plane layer 18 or the horizontal data plane layer 50. In some embodiments, statistics may be collected from controllers 12 using SNMP, SYSLOG or similar technologies. In some embodiments, statistics may be collected in the horizontal data plane layer 50 using the native queue statistics, flow statistics and/or port statistics generated by programs such as OpenFlow™ (Open Networking Foundation (ONF), Menlo Park, CA), ETCONF (RFC 6241), P4 Runtime (P4.org's API working group), Simple Network Management Protocol (SNMP) (Internet Engineering Task Force (IETF), Fremont, CA) running on the switches in the horizontal data plane layer 50. In either case, such information can be sent to an active computational center 14 for further processing and analysis and to make mitigation decisions. Based upon the information received, a control signal is generated and transmitted by the active computational center 14 according to one or more parameters programed into a smart contract in the blockchain-based security and autonomy management layer 30.

Figure 7:
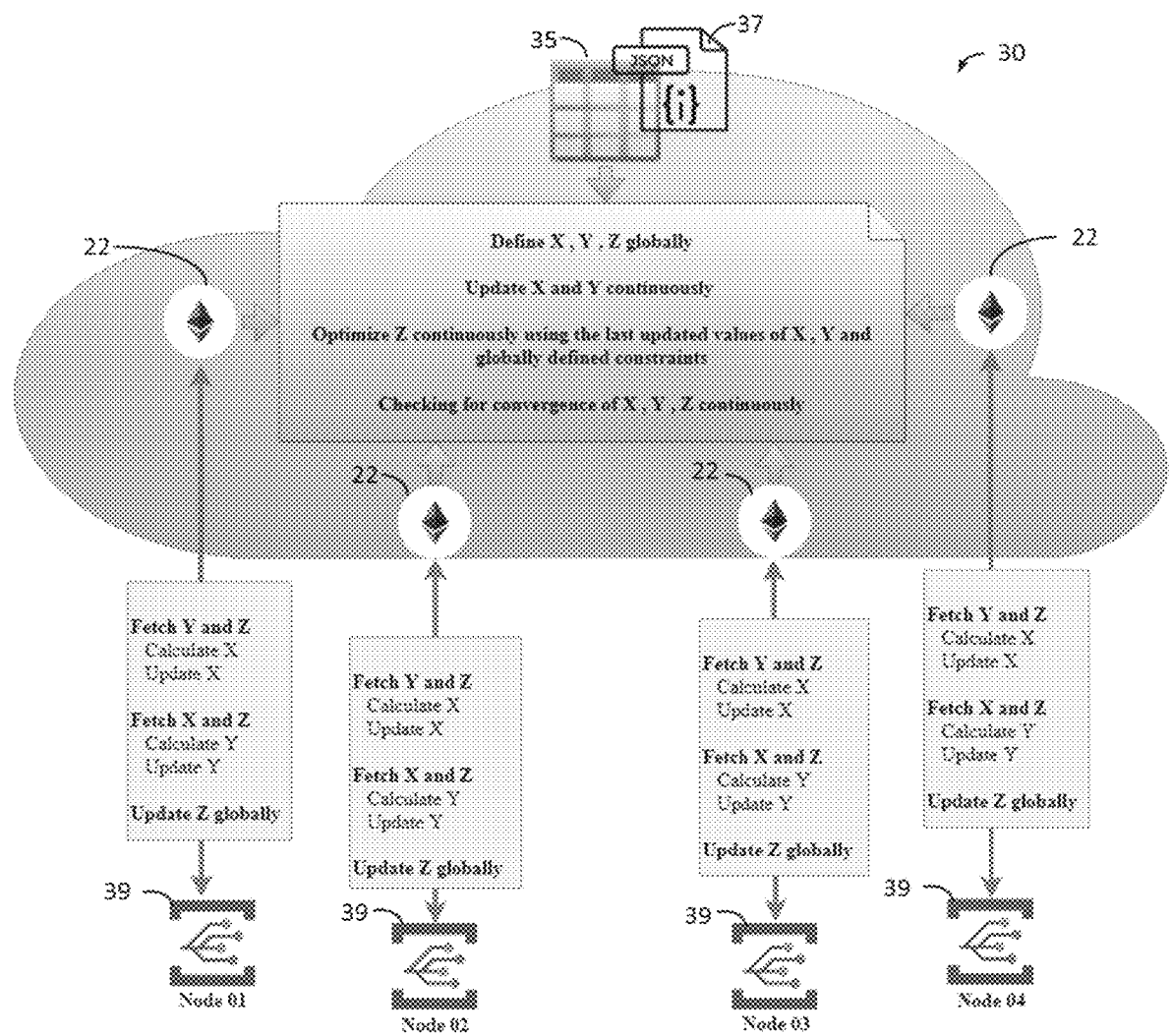
FIG. 7 is a schematic diagram illustrating the secure, autonomous, and decentralized cooperation amongst the computational centers and/or SDN controllers according to one or more embodiments of the blockchain secured, software-defined network and monitoring system of the present invention.

One method for controlling large-scale critical infrastructures such as energy and water systems provided by the blockchain secured, software-defined network and monitoring system of the present invention is illustrated in FIG. 7. In these embodiments, the blockchain-based layer enforces the authenticity and integrity of both locally and globally optimized management variables by exploiting consensus protocols, alternating direction method of multipliers (ADMM) techniques, and distributed deep reinforcement learning methods. In the embodiment shown in FIG. 7, the blockchain based security and autonomy layer 30 comprises memory 35 containing a smart contract 37, and is in operative communication with one or more nodes 39 through blockchain middleware 22 installed at each node 39. In these embodiments, each node will comprise a computer or other logic-based device having control capabilities. FIG. 7 provides an example of an ADMM-based decentralized optimization scheme where {X, Y} are a set of local variables and {Z)} is the global variables. In each step, the local variable set is updated by using the global variable of previous step, then the global variable is updated by using the updated local variables of current step. Two set of variables are updated alternatively. The interaction between local and global updates and the update algorithm of global variables are defined in smart contract 37. Data such as variable values and device status are stored in blockchain layer 30. Local variables are stored in each controller and updated in the blockchain in a timely manner, whereas local variable aggregation and global variable calculation are done via a smart contract in the blockchain layer 30.

Turning again to FIG. 2, the blockchain secured, software-defined network and monitoring system of the present invention further comprises a horizontal data plane layer 50 comprising a plurality of P2P domains 24, each containing one or more domain switch 52 and one or more domain edge switch 54. In one or more embodiments, each domain switch 52 may be a virtual switch or a hardware switch. In some embodiments, each domain edge switch 54 may be a virtual switch or hardware switch. In some embodiments, domain switches 52 and domain edge switches 54 are OpenFlow-enabled switches. In some embodiments, domain switches 52 and domain edge switches 54 are SNMP-enabled switches.

As can be seen in FIG. 2, each controller 26 is operable connected to some or all of the domain switches 52 and domain edge switches 54 in a particular P2P domain 24, such that each controller 26 directly communicates with a single P2P domain 24. In some other embodiments, a controller 12 may be in communication with domain switches 52 and/or domain edge switches 54 in more than one P2P domain. Each controller 26 may communicate with the domain switches 52 and domain edge switches 54 in a particular P2P domain 24 by any conventional means, including, but not limited to, southbound protocols enabled by OpenFlow™ (Open Networking Foundation (ONF), Menlo Park, CA), NETCONF (RFC 6241), P4 Runtime (P4.org's API working group), or Simple Network Management Protocol (SNMP), (Internet Engineering Task Force (IETF), Fremont, CA) The P2P domains 24 may, in some embodiments, be located with controller 26 for easier communication, but this need not be, and often is not, the case. In some embodiments, one or more P2P domain 24 may be remotely located, but accessible to the system through controller 26.

As shown in FIG. 2 domain switches 52 are operatively connected to the domain edge switches 54 and/or other domain switches 52 in a peer to peer domain 24 via intra-domain data lines (connections) 53. As can be seen, domain edge switches 54 in different peer to peer domains 24 are operatively connected via inter-domain data lines (connections) 55. Intra-domain data lines (connections) 53 and inter-domain data lines (connections) 55 are not particularly limited and may be any suitable wired or wireless connection. In some embodiments, suitable intra-domain data lines (connections) 53 may include, without limitation, Ethernet, Zigbee, WiFi, and LTE. In some embodiments, suitable inter-domain data lines (connections) 55 may include, without limitation, Ethernet, WiFi, or LTE.

The number of domain switches 52 and domain edge switches 54 in a particular P2P domain 24 is not particularly limited, provided that each P2P domain 24 has at least one of domain switch 52 and at least one domain edge switch 54. The number of domain switches 52 and domain edge switches 54 in a particular P2P domain 24 will depend on a variety of factors, including but not limited to scalability of the infrastructure and the targeted service.

As shown in FIG. 2, the P2P domains are connected with each other in a decentralized manner via the domain-edge switches to form horizontal data plane layer 50. (See, FIG. 2) In various embodiments, messages, data and/or commands between a controller 26 and a virtual machine 56 in the associated P2P domain 24 (intra-domain communications) is routed through domain switches 52, whereas messages, data and/or commands between a controller 26 and a virtual machine 56 in a different P2P domain 24 (inter-domain communications) is routed through domain edge switches 54. In some embodiments, data are routed between general computing devices including virtual machines, personal computers, baremetal servers, and embedded computers. In some embodiments, P2P domains 24 further comprise a plurality of virtual IP addresses.

In one or more embodiments, the controllers 26 in the SDN controllers 12 may have one or more of the following functions, among others, with respect to data plane layer 50: (i) carrying out inter-domain routing of data plane traffic that includes handling ARP requests/replies of hosts and installing flow entries in the switches from source to destination and vice versa; (ii) carrying out intra-domain routing of data plane traffic that includes sending ARP requests/replies to/from a destination domain, sending the packet to the edge domain switch, and (iii) sending the incoming packet from domain-edge switch to the inter-domain destination; and handling the transient data-plane traffic. In one or more of these embodiments, a certain controller domain is also responsible in relaying data-plane traffic. This is what is referred to as "transient data-plane traffic" (i.e., acts as an intermediate domain to relay traffic from one domain to another). In addition, controllers 26 in the SDN controllers 12 play the roles of sender, receiver and traffic parser with respect to control-plane data, as set forth above. In these embodiments, "traffic parser" is one of the roles played by a controller, where it relays inter-controller traffic (i.e., acts as an intermediate node to relay traffic from one controller to another).

In various embodiments, blockchain secured, software-defined network and monitoring system of the present invention further comprises a deep learning-driven decision-making layer developed to enhance the situational awareness for networking management via interacting with multi-controller SDN networking layer and for application-driven operation via interacting with blockchain-based security and autonomy management layer as shown in FIG. 1. In various embodiments, the present invention uses a hybrid semi-supervised learning-enabled situational-awareness computing tool to ensure that the blockchain secured, software-defined network and monitoring system of the present invention has assured situational awareness, even when the labeled data is parsed and/or the historical incidents are unbalanced. (See, FIGS. 7-9)

As set forth above, supervised learning has proved to be valuable in various application fields. To be successful, however, conventional supervised learning models need a tremendous amounts of annotated/labeled and balanced training samples, which is expensive and difficult to guarantee in many practical situations where the unannotated/unlabeled data is much more common than the annotated data.

To address these and other shortcomings in known supervised learning models, the various embodiments of the present invention include a novel computing method, referred to herein generally as "hybrid semi-supervision machine learning," which exploits domain knowledge to enable accurate results even in the presence of limited labeled data. Since labeled data expensive and limited, the manner in which the unlabeled data is utilized in semi-supervised learning models, will dramatically influence the quality of learned model. One method is to generate pseudo labels for unlabeled data which in turn helps to enlarge the training dataset. Another way is to utilize domain knowledge to supervise both labeled and unlabeled data.

Generally, domain knowledge is usually used in these systems in two ways: (i) to help the design of learned model structure and (ii) to help to regularize the parameter of learning model. Most domain knowledge is structural knowledge. So, it has been found that a latent-feature model can be initialized to mimic the distribution of these structural domain knowledge variables by referring the latent variables of the learned model. By reducing the distance between true distribution of domain knowledge variables and the faked distribution produced by the latent-feature model, the learned model is restricted to output such latent variables that fulfill the distribution of the domain knowledge. In this case, the parameters of learned model are regularized since they directly impact the latent variables of learned model.

In various embodiments, the deep learning-driven decision-making layer 60 will comprise a fuzzy domain-constraint-based framework which utilizes an additional penalty network to approximate unknown parameters not limited to target variable (model output) of the learned model by referring the abstract latent variables of the learned model. As used herein, "a fuzzy domain-constraint-based framework" is a mathematical models formulating domain constraints with fuzzy logics. As will be understood, "fuzzy logic" are fuzzy logic is an extension of Boolean logic having multiple truth values from 0 to 1, instead of a single truth value 1 in Boolean logic. These truth values denote the truth degree. As used herein, the term "penalty network" refers to the learning models enforcing the domain constraints by assessing a "penalty," where posterior regularization constrains/regularizes the logics of the last hidden layer of primary model. In essence, the penalty network transfers the latent variables to physical variables, which can be regularized by domain knowledge directly. In some embodiments, the deep learning-driven decision-making layer will comprise a domain-constraint-based model for semi supervision which encapsulates domain constraint knowledge in a neural network. In these embodiments, the penalty network is implemented to emulate the approximate physical parameters of a physical system and the approximated values are optimized within a parameter space restricted by domain knowledge and during the training process, both the penalty network and primary network are updated recursively and the penalty network will restrict the search space of the primary network.

As used herein, the term domain knowledge refers to established and/or widely accepted principles or guidelines in the targeted application domain. The domain knowledge can be complex differential equations or logical constraints. These constraints may include latent features other than labels and observations (i.e. inputs). Similarly, the term "label" is used to refer to annotation on the data and the term "labelled" refers to data that has been annotated. As follows, "labelled data" refers to annotated data and "unlabeled data" refers to raw data that is not annotated.

Figure 8:
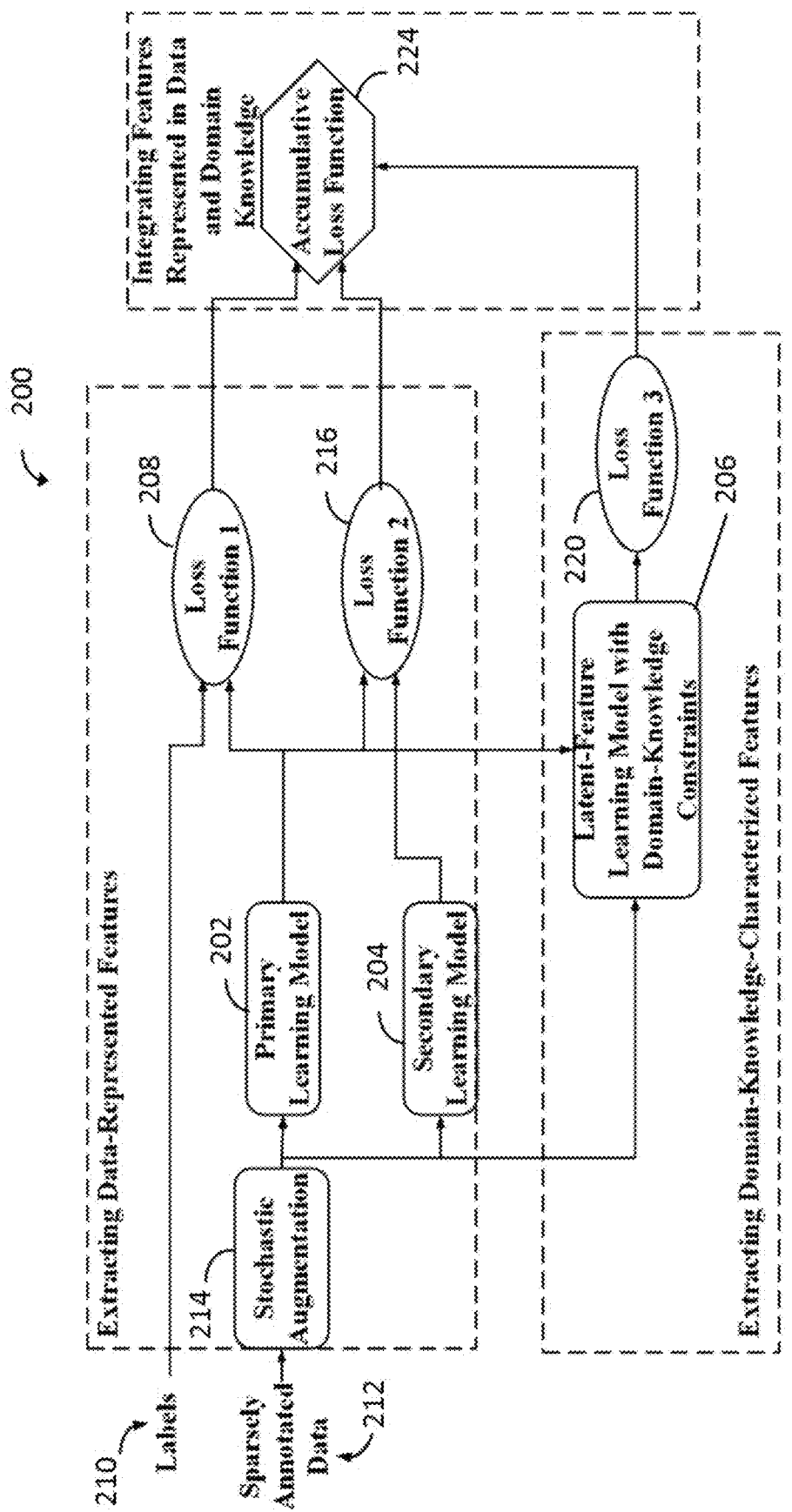
FIG. 8 is a simplified schematic illustration of a hybrid semi-supervised learning-based situational-awareness computing tool according to one or more embodiments of the blockchain secured, software-defined network and monitoring system of the present invention.
Figure 9:
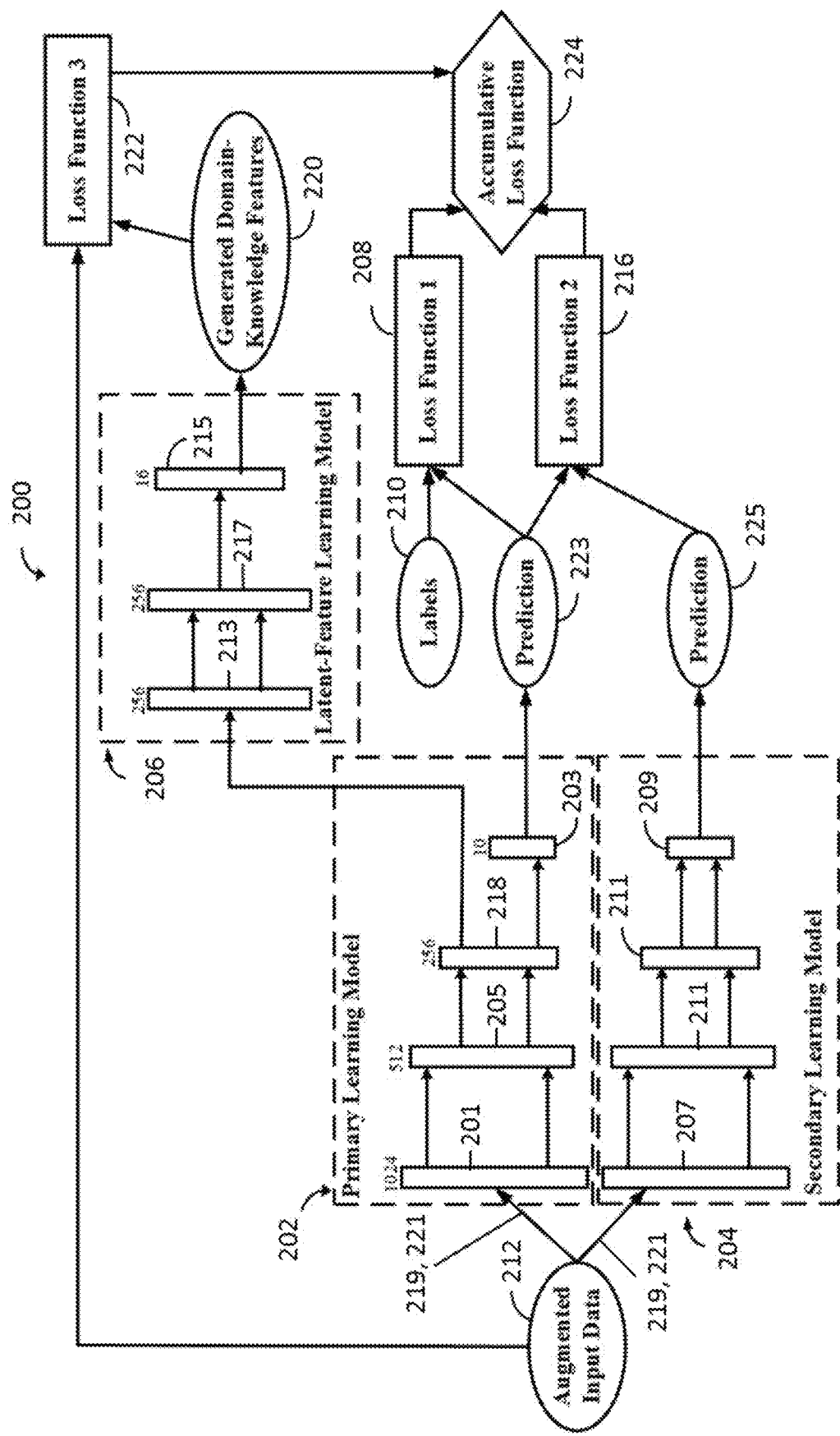
FIG. 9 is a more detailed schematic illustration of a hybrid weakly-supervised learning-based situational-awareness computing tool according to one or more embodiments of the blockchain secured, software-defined network and monitoring system of the present invention.

An overview of a knowledge domain-enabled hybrid semi-supervision learning method 200 according to one or more embodiment of the present invention is shown in FIG. 8. As shown in FIG. 8, the method 200 comprises primary 202, secondary 204, and latent-feature 206 neural network (NN)-based learning models. In various embodiments, primary learning model 202 comprises a normal deep neural network, having at least two layers. In some embodiments, primary learning model 202 is a normal deep neural network applying the multiplicative noise techniques, such as dropout. In one or more embodiments, the secondary learning model 204 will comprise a neural network having a structure similar to the primary learning model 202 and will emulate the behaviour of the primary learning model 202 by calculating an Exponential Moving Average of weight of the primary learning model. In some of these embodiments, the secondary learning model 204 is a normal deep neural network applying the multiplicative noise techniques, such as dropout. In various embodiments, latent-feature learning model 206 comprises a normal deep neural network, having at least two layers and generates the regularized latent features that satisfy the domain knowledge constraints (of loss function 3). As will be apparent and is shown in FIG. 9, the primary learning model 202 will have a first layer 201, a last layer 203 a second to last layer 118, and in some embodiments, one or more intermediate layers or dropout layers 205; the secondary learning model 204 will have a first layer 207, a last layer 209, and one or more intermediate layers or dropout layers 211; and the latent-feature learning model 206 will have a first layer 213, a last layer 215, and one or more intermediate layers or dropout layers 217. Primary learning model 202 receives labeled data 219 and unlabeled data 221 from the augmented input data 212 and will generate a prediction or pseudo label 223 of the labeled data 219 and unlabeled data 221, respectively, which is transmitted to loss function 1 208 and loss function 2216. Similarly, secondary learning model 204 receives labelled data 219 and unlabeled data 221 from the augmented input data 212 and will generate a prediction or pseudo label 225 of the labeled data 219 and unlabeled data 221, respectively, which is transmitted to loss function loss function 2 216. The embodiments shown in FIGS. 8-10 use a data-driven C-class classification problem to further illustrate the details of the deep learning-driven decision-making layer of the present invention.

Turning back to FIGS. 8 and 9, the primary learning model 202 is denoted $f_{\theta_p}(\cdot)$, where $\theta_p$ represents the parameters of the primary learning model 202. It is designed to extract the features from the annotated data and to interact with the other two learning models. To achieve this goal, the Loss Function 1 208, denoted as $L_1(\theta_p)$, is formulated to minimize the total distance between the true labels 210 $y_i^m \in y$ and the corresponding inference results $f_{\theta_p}^i(x_m)$ for labeled data $x_m \in x$ achieved by the primary learning model 202 as follows:

$$L_1(\theta_p) = \frac{1}{N} \sum_{m=1}^{n} \sum_{i=1}^{C} E_{\theta_p}\left(y_i^m, f_{\theta_p}^i(x_m)\right) \qquad \text{(Eq. 8)}$$

where N is the number of annotated data 212 and C is the number of classes. $E_{\theta_p}(\cdot,\cdot)$ is the cross-entropy between the true labels 210 and the corresponding inference results. Loss function 1 represents the distance between the true labels and the corresponding inference results for primary learning model 202. Additionally, in some embodiments, the sparsely annotated data 210 is subjected to stochastic data augmentation 214. As will be understood by those of skill in the art, stochastic data augmentation 214 is a technique increasing diversity of data available for training models without actually collecting new data and is applied to increase the effective size of existing labeled data.

The secondary learning model 204 may be denoted $f_{\theta_s}(\cdot)$, where $\theta_s$ denotes the parameters of the secondary learning model 204. The secondary learning model 204 is designed to interact with the primary learning model 202 to extract the features from the raw data by obtaining the pseudo labels of these unlabeled data. To achieve this goal, the secondary learning model 204 is a structure similar to that of the primary learning model 202. However, the model parameters $\theta_s$ of the secondary learning model 204 are achieved by calculating the exponential moving average of the historical values of $\theta_p$, $\theta_{s,t} \leftarrow \beta \theta_{s,t-1} + (1-\beta) \theta_{p,t-1}$, where $\beta$ is a smoothing hyperparameter and t is the index of the current epoch or step. Secondly, the interaction between the primary 202 and secondary 204 learning models via a Loss Function 2 (denoted as $L_2(\theta_p, \theta_s)$) 216, which is formulated to fuse the features extracted by using the primary 202 and secondary 204 learning models and to maximize the consistency between the prediction of the primary 202 and secondary 204 learning models as follows:

$$L_2(\theta_p, \theta_s) = \alpha(t) \left[ \frac{1}{N+N'} \sum_{m=1}^{N+N'} \sum_{i=1}^{C} D_{KL}\big(f_{\theta_s}^i(x_m) \| f_{\theta_p}^i(x_m)\big) \right] \quad \text{(Eq. 9)}$$

where $\alpha(t)$ is a ramp-up function to determine the contribution of the secondary learning model, which is initialized as 0 and increases gradually, and N' is the number of raw data ("Sparsely annotated data" in FIG. 8). Loss Function 2 216 represents the consistency between the prediction of the primary and secondary learning models consistent. Furthermore, to enhance the generalization of the interaction between the primary and secondary learning models 202, 204 and to mitigate the uncertainty introduced by the scarcity of the labeled data, a dynamic model reconfiguration of the secondary learning model 202 may be realized by applying multiplicative noise techniques, namely Dropout and DropConnect algorithms.

The latent-feature learning model 206 is denoted as $f_{\theta_l}(\cdot)$, where $\theta_l$ denotes the parameters of the latent-feature learning model 206, is designed to exploit the domain knowledge for the task model to regularize the latent features $\ell$ extracted by the primary learning model 202 $f_{\theta_p}(\cdot)$. Additionally, this layer also provides an interface on which the features demonstrated by the domain knowledge constraints and the features presented by the training data enforce each other to improve the overall accuracy of the model. The latent features $\ell$ can be the soft prediction vector $f_{\theta_p}(x)$ or the output of the last hidden layer 218 of the primary model $f_{\theta_p}'(x)$ where $\theta_p'$ denote the weights of the primary learning model 202 except those of the output layer. Considering that $f_{\theta_p}'(x)$ exhibits more feature information than $f_{\theta_p}(x)$, $\ell = f_{\theta_p}'(x)$ was selected. However, as is apparent, the latent features $\ell$ are abstract and not directly related to the domain knowledge. To address this challenge, the latent-feature learning model transfers the latent features $\ell$ to the approximate unknown critical-parameter vector z of the targeted task, such as the unknown critical parameters of a physical system for the task. In other words, $f_{\theta_l}(\ell) \approx z$. The latent-feature learning model 206 is trained to gradually optimize the approximated critical parameters z within a parameter space restricted by the domain knowledge, which results in regularizing the latent features $\ell$, the conditional probability $p_{\theta_p}'(\ell|x)$, and eventually the primary learning model $f_{\theta_p}(\cdot)$. Let $\tilde{G} = \{\tilde{G}_i(x, f_{\theta_l}(\ell), z')\}$ be a domain knowledge constraint set 220, where z' denotes the available parameter vector.

In one or more embodiments, the domain knowledge constraints that are considered in the hybrid semi-supervision learning model of the present invention may be modeled as follows:

$$\tilde{G}_i(x, f_{\theta_l}(\ell), z') \leq c_i \quad \text{(Eq. 10)}$$

where $c_i \in c$ is a boundary parameter for the domain knowledge constraint $\tilde{G}_i(\cdot)$. In one or more embodiments, the Loss Function 3 $L_3(\theta_p', \theta_l)$ 222 may be formulated as follows:

$$L_3(\theta_p', \theta_l) = D_{KL}(q_{\theta_l}(\ell) \| p_{\theta_p}'(\ell|x)) + \gamma \| \mathbb{E}_{\theta_l}[\tilde{G}_i(x, f_{\theta_l}(\ell), z')] - c \|_\beta \quad \text{(Eq. 11)}$$

where $g_{\theta_l}(\ell)$ is an auxiliary variational probability, which is learned via posterior regularization according to the domain knowledge constraints $\tilde{G}(\ell)$, and is optimized by imitating the conditional probability $p_{\theta_p}'(\ell|x)$. The first KL-divergence term in Eq. 11 is formulated to enforce the model posterior $p_{\theta_p}'(\ell|x)$ to approach the desired distribution space $q_{\theta_l}(\ell)$ based on the domain knowledge. The second term (a norm $\|\cdot\|_\beta$) denotes the penalty cost of bounded domain knowledge constraints. $\gamma$ is set to adjust the weight of the second term. By using Eqs. (8) through (11), the accumulative loss function 224 in FIG. 8 can be calculated as $L = L_1 + L_2 + L_3$, which is then used to train the hybrid semi-supervision learning model of various embodiments of the present invention.

A data classification task may be used as an example to further explain the structure of the model. Assume primary learning model 202 has input variable $x \in X$ and output variable $y \in Y$ where y is k-dimension one hot vector. Primary learning model 202 learns a conditional probability $p_{\theta_p}(y|x)$ and output a soft prediction vector $f_{\theta_p}(x)$ where $\theta_p$ represents the weights of primary learning model 202. Consider $\theta_p'$ as the weights of the primary learning model 202 except those of the last layer, the latent variables of last hidden layer 218 in primary learning model 202 is $$l = f_{\theta_p}'(x) \quad \text{(Eq. 12)}$$

Since l is the latent variables of the last hidden layer 218, it usually has a dimension greater or equal to the dimension of output and is considered to contains more feature information of input variable x than soft prediction vector $f_{\theta_p}(x)$. Thus, instead of regularizing the output posterior of the primary learning model 202, the latent variable l is optimized to better understand the conditional probability $p_{\theta_p}'(l|x)$. Further, domain knowledge is implemented to regularize the posterior l.

However, l is an abstract vector and it is, therefore, impossible to collect prior knowledge of l. To address this problem, a penalty network is introduced as set forth above to translate the abstract variables to physical parameters according to domain knowledge. The output of the penalty network is denoted as $f_{\theta_q}(l)$ where $\theta_q$ represents the weights of the penalty network. Domain knowledge constraints define a function set of x and $f_{\theta_q}(l)$ $$G(x, f_{\theta_q}(l), z) \leq c \quad \text{(Eq. 13)}$$

where c is a boundary vector of domain knowledge constraint, z denotes a vector of known parameters and G is a set of constraint equations or inequalities.

The posterior regularization learns an auxiliary variational probability $g_{\theta_q}(l)$ based on the domain knowledge constraints above. $q_{\theta_q}(l)$ is optimized by imitating the conditional probability $p_{\theta_p}'(l|x)$. And the loss of posterior regularization is $$L_{pr}(\theta_p', \theta_q) = KL(g_{\theta_q}(y) \| p_{\theta_p}'(l|x)) + \gamma \cdot \| \mathbb{E}_{\theta_q} | G(x, f_{\theta_q}(l)) | - c \|_\beta \quad \text{(Eq. 14)}$$

where the first term indicates KL divergence is used to push model posterior $p_{\theta_p}'(l|x)$ to desired distribution space $Q_{\theta_q}(l)$ based on domain knowledge. The second term (a norm $\|\cdot\|_p$)

denotes the penalty cost of bounded domain knowledge constraints. And γ is set to adjust the weight of the second term.

To fuse the features extracted from the primary learning model 202 and secondary network learning model 204, consistency cost is utilized to minimize the feature difference between these two models according to Equation 15:

$$L_{con}(\theta_p) = \mathbb{E}_{\theta_p}(f_{\theta_s}(x), f_{\theta_p}(x)) \quad \text{(Eq. 15)}$$

where output posteriors of two models are compared to compute the consistency cost. In this design, the exponential moving average of historical network weights of the primary network are used to construct the secondary learning model 204. Meanwhile, traditional classification loss of labeled data is used to constrain the learned model as follows:

$$L_{class}(\theta_p) = \mathbb{E}_{\theta_p}(y, f_{\theta_p}(x)) \quad \text{(Eq. 16)}$$

The training procedure of the hybrid semi-supervision learning algorithm is implemented based on an Expectation Maximization (EM) algorithm. In addition, a self-ensembling approach is utilized to generate pseudo labels for unlabeled data to reinforce the generalization of the primary learning model. The details of a training procedure according to one or more embodiment of the present invention are illustrated in Algorithm 1 (FIG. 10). Step 3 is designed to regularize the critical parameters for the task model, such as the critical parameters of a physical system for the task, which are not limited to the target output y. Step 4 executes the back propagation of primary learning model by optimizing Loss 3, which refers to the updated desired distribution of posteriors and optimizes the weights of primary network $\theta_p$. Steps 5 and 6 are the steps to ensemble the primary and secondary learning models. Step 5 executes the back propagation of primary learning model by optimizing Loss 1 and 2 and Step 6 updates the secondary model directly by computing the Exponential Moving Average (EMA) of primary model. As will be apparent, the back propagation is used to optimize structures (weights) of learning modes 202, 204, and 206.

In some embodiments, the hybrid semi-supervision method of the present invention may have the more detailed structure shown in FIG. 9. Comparing the specific implementation shown in FIG. 9 and the general structure illustrated in FIG. 8, it can be seen that the primary learning model 202 is realized via a four-layer dense neural network, the secondary learning model 204 has a similar structure as that of the primary model, and the latent-feature learning model 206 is executed as a three-layer dense neural network. The latent features, which are the output of the last hidden layer 218 of the primary learning model 202, are used as the input of the latent-feature learning model.

In another aspect, the present invention is directed to a method for extracting useful features from labelled and non-labelled data contained in the horizontal data plane layer of the blockchain secured, software-defined network and monitoring system, as described above. As set forth above, in one or more embodiments of the blockchain secured, software-defined network and monitoring system described above will comprise at least one computational center that is programmed to include a deep learning-driven decision making layer having, among other things, the hybrid weakly-supervised learning-enabled model described above. In these embodiments, the data requested from the horizontal data plane layer will contain both labelled and non-labelled data. In these embodiments, deep learning-driven decision making layer utilizes domain knowledge constraint to force the neural networks to effectively extract more useful features from training data with sparse labels.

In one or more of these embodiments, labelled and non-labelled data containing useful information is first collected from the horizontal data plane layer of a blockchain secured, software-defined network and monitoring system constructed as described above. As used herein, the term "useful information" refers to information contained in the data set that can be used to make a decision. In some embodiments, the "useful information" would include the sensing data/measurements required for networking management, such as QoS and QoE information. In one or more embodiments, the useful features contained in the data collected will comprise domain knowledge and the features by the data.

In some embodiments, the data is collected according to parameters programmed into a smart contract in blockchain-based security and autonomy management layer 30. In some embodiments, according to parameters programmed into one or more computational center. In some embodiments, collected and transmitted to the will be networking situational information, network statistics and/or data. As set forth above, the types of networking situational information, network statistics and/or data that may be collected in these embodiments will depend upon the particulars of the network and the smart contract, and may include networking situational information, network statistics and/or data collected from other SDN controllers 12 and/or horizontal data plane layer 50. In some embodiments, the networking situational information, network statistics and/or data collected comprises local and global Quality of Service (QoS) or Quality of Experience (QoE) measurements generated by domain switches 52 and domain edge switches 54. In some embodiments, statistics may be collected from controllers 12 using SNMP, SYSLOG or similar technologies. In some embodiments, statistics may be collected in the horizontal data plane layer 50 using the native queue statistics, flow statistics and/or port statistics generated by programs such as OpenFlow™ (Open Networking Foundation (ONF), Menlo Park, CA), NETCONF (RFC 6241), or P4 Runtime (P4.org's API working group) running on the switches in the horizontal data plane layer 50. Southbound protocols 21 interface between the control plane layer 18 and data plane layer 50.

In various embodiments, the deep learning-driven decision making layer will generate a control signal that will be broadcast to the network through the SDN controller layer 18 that requests data contained in the horizontal data plane layer 50. In these embodiments, a first control signal is broadcast to one or more of the plurality of SDN controllers 12. (See, FIG. 6) In some embodiments, the first control signal is generated and transmitted according to one or more parameters programed into a smart contract in said blockchain-based security and autonomy management layer. In some embodiments, the first control signal is generated and transmitted according to one or more parameters programed into a smart contract in said blockchain-based security and autonomy management layer from the networking situational information, network statistics and/or data collected that have been collected and forwarded to the computational centers 14.

As described above, the control signal sent will contain time stamp and message data and when it is sent a hash value for each is generated and then combining to form a hash value unique to that control signal, that is then saved to the blockchain database in the blockchain based security and autonomy layer 30 for use in authentication. Each of the one or more of said plurality of software-defined network (SDN) controllers 12 that receives a control signal will generate a hash value for the time stamp of the received control signal and another hash value for the received control signal data, combine them to form a received control signal hash value; and then verify the authenticity of the received control signal by comparing said received control signal hash value to the sent control signal hash value saved in the said blockchain based security and autonomy layer 30.

The requested data is collected the from the horizontal data plane layer 50 and transmitted to one of the active computational centers 14, where it is acted upon by the domain knowledge-enabled hybrid semi-supervised learning-enabled situational awareness tool 200 in the deep learning-driven decision making layer, as set forth above. In these embodiments, the hybrid semi-supervised learning-enabled situational awareness tool will extract useful features from the requested data, as set forth above and shown in FIGS. 8 and 9. In some of these embodiments, the data collected will have both labelled and non-labelled data and the useful features are extracted from the data collected as shown in shown in FIGS. 8-10.

EXAMPLES

The following examples are offered to more fully illustrate the invention, but are not to be construed as limiting the scope thereof. Further, while some of examples may include conclusions about the way the invention may function, the inventor do not intend to be bound by those conclusions, but put them forth only as possible explanations. Moreover, unless noted by use of past tense, presentation of an example does not imply that an experiment or procedure was, or was not, conducted, or that results were, or were not actually obtained. Efforts have been made to ensure accuracy with respect to numbers used (e.g., amounts, temperature), but some experimental errors and deviations may be present. Unless indicated otherwise, parts are parts by weight, molecular weight is weight average molecular weight, temperature is in degrees Centigrade, and pressure is at or near atmospheric.

Example 1

Evaluation of Hybrid Weakly-Supervised Learning-Based Computing Tool on Sparsely Labeled Training Data Set For proof-of-concept purposes, a hybrid weakly-supervised learning-based computing tool according to the present invention was utilized to detect the physical failure and identify the location of its occurrence for a 9-bus power system operation. In this experiment, the frequencies of three power generators, which were measured via phasor measurement units (PMUs) and sparsely labeled, were used as the training data.

The dataset used was a frequency series of three power stations in a WSCC 9-Bus Power System. The physical model was a second-order differential equation modeling the physical coupling between the synchronous generators in the power system. A power outage attack was implemented at a certain point of frequency series, anywhere between two buses. The learning task is to predict the location of the attack—which two buses was the power attack between. The experiments were run using (i) supervision with only the labeled data; (ii) weak-supervision with labeled and unlabeled data; and (iii) a hybrid weak-supervision model according to embodiments of the present invention with labeled and unlabeled data, with 1.25%, 5%, 10%, and 100% labeled data. The results of these tests are shown Table 1, below and in FIG. 11.

TABLE 1

| | # Labels | | | | |
|---|---|---|---|---|---|
| | 90 (1.25%) (%) | 180 (5%) (%) | 360 (5%) (%) | 720 (10%) (%) | 7200 (100%) (%) |
| Supervision with only labeled data | 87.44 ± 2.98 | 90.15 ± 0.25 | 93.14 ± 1.24 | 98.19 ± 1.09 | 99.98 ± 0.02 |
| Weak-supervision with labeled and unlabeled data | 90.47 ± 1.89 | 96.64 ± 3.28 | 99.90 ± 0.10 | 99.95 ± 0.05 | |
| Hybrid weak-supervision with labeled and unlabeled data | 99.74 ± 0.29 | 99.89 ± 0.09 | 99.96 ± 0.04 | 99.98 ± 0.03 | |

As can be seen, the hybrid weak-supervision model according to the present invention performed significantly better than either supervision with only labeled data or weak-supervision with labeled and unlabeled data.

Example 2 (Prophetic)

Deployment as a Means of Establishing Emergency Response Networks in a Disaster Situation The 3S-Chain system can be used to establish emergency response networks in disaster situations. In this example, various conventional networking entities (switches in this case) are unavailable due to a natural disaster. The proposed system is able to provide a disaster-resilient networking infrastructure by leveraging various isolated Internet Service Provider (ISP) domains and establishing a secured controller layer. Therefore, by using this system, end-to-end network connections can be established in a disaster without relying on different vendor specific legacy devices if the devices can support OpenFlow protocol. The trust and security between untrusted ISPs can be established via the use of Blockchain. It is a known fact that, network traffic will keep on changing dynamically due to a range of factors due to a disaster. Because the deep learning-driven decision-making layer, the system is able to realize optimal traffic routing through various ISPs.

Example 3 (Prophetic)

Figure 12:
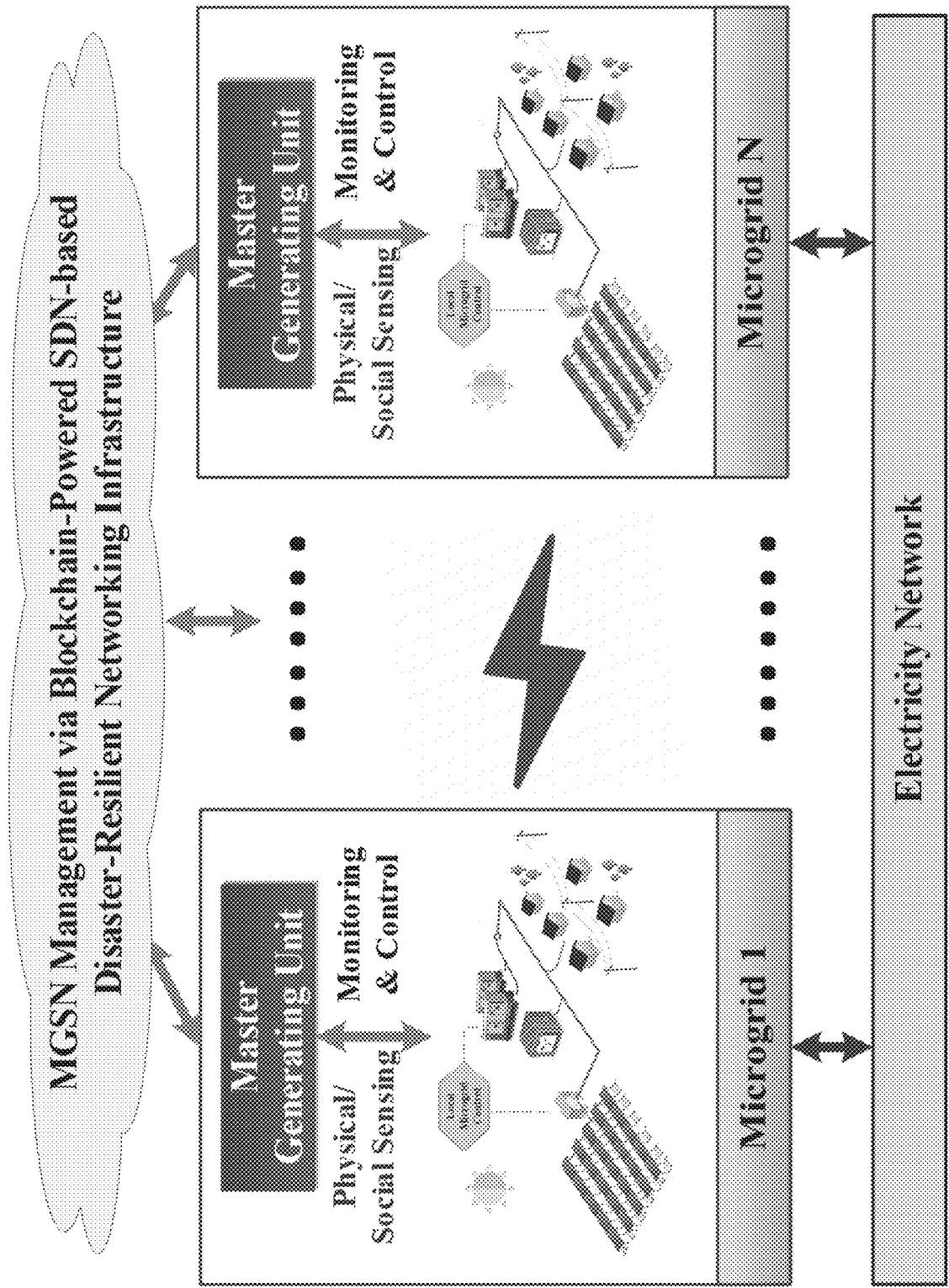
FIG. 12 is an illustration of using the 3S-Chain system according to one or more embodiments of the present invention for supporting energy infrastructure in disaster.

Deployment as a Means of Enabling Disaster-Resilient Communications for Energy Infrastructure Microgrids are known as self-sufficient and localized grids, serving considerably small areas, whose self-sufficiency is provided through renewable energy sources and distributed generations. According to the U.S. Department of Energy Microgrid Exchange Group, it is stated that a microgrid can operate in both grid-connected and islanded modes, as illustrated in FIG. 12. In a disaster where a cluster of microgrids are isolated from the main grid, the 3S-Chain is able to establish the coordination between the isolated microgrids and to distribute the surplus power of microgrids towards the other microgrids that lack power. Extending this scenario from a single microgrid provider to multiple microgrid providers will enable the seamless energy distribution without discrimination between several energy infrastructure providers in disaster situations.

Example 4 (Prophetic)

Figure 13:
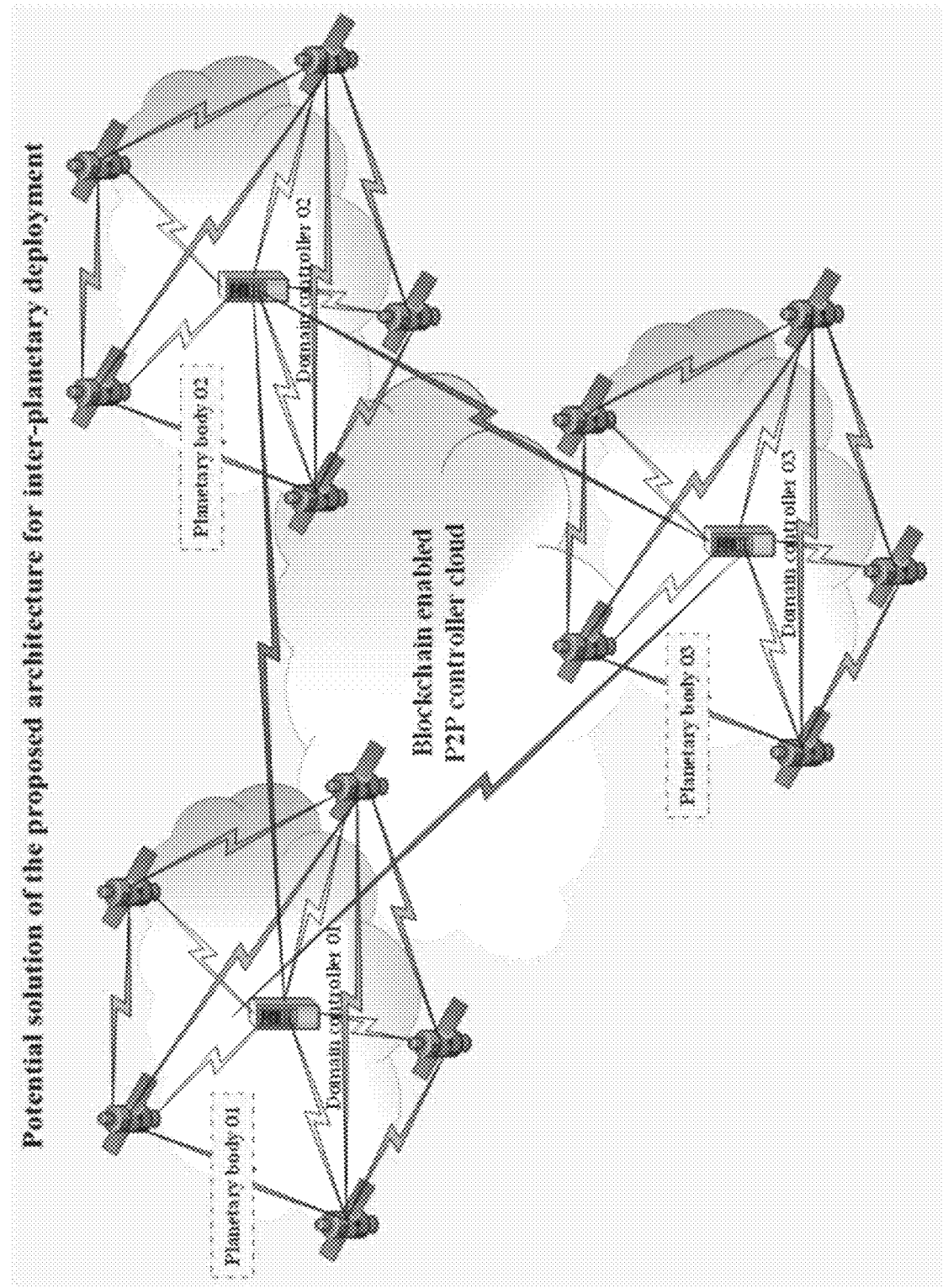
FIG. 13 is an illustration of using the 3S-Chain system according to one or more embodiments of the present invention for establishing a deep space communication network.

Deployment as a Means of Enabling Intelligent and Secure Deep Space Communication Networks In one or more embodiments, the 3S-Chain system can also be used to establish an intelligent and secure deep space communication network where the controllers span across multiple geographical domains (e.g. planetary bodies) as illustrated in FIG. 13. A specific controller can be designed to control a single domain of satellites that functions as OpenFlow switches in the system. Possible cyber-attacks in the inter-planetary network can be detected through the blockchain based hashing mechanism and big-data analytics-based anomaly detection. Furthermore, the system makes it possible to realize wide and reliable collaboration amongst distrustful entities for deep space exploration.

In light of the foregoing, it should be appreciated that the present invention significantly advances the art by providing a blockchain secured, software-defined network and monitoring system that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A blockchain secured, software-defined network and monitoring system comprising:
a plurality of software-defined network (SDN) controllers and one or more computational centers,
wherein each of said SDN controllers is configured to interface with: one or more SDN controller of said plurality of SDN controllers, a blockchain database via installed blockchain middleware, at least one of said one or more computational centers via installed communications middleware, and at least one peer-to-peer domain,
wherein said peer-to-peer domain comprises at least one domain switch that is in communication with the SDN controller for intra-domain communication, and at least one domain edge switch, which is in communication with the SDN controller and one or more of said at least one domain switches for inter-domain communication, and
wherein said plurality of SDN controllers and said one or more computational center are networked together to form a software-defined network having a horizontal controller plane layer comprising said plurality of SDN controllers, the installed blockchain middleware, and the installed communications middleware, and a horizontal data plane layer in communication with said horizontal controller plane layer and comprising the peer to peer domains, the domain switches, and domain edge switches; and
a blockchain-based security and autonomy management layer comprising said blockchain database and said blockchain middleware wherein said blockchain-based security and autonomy management layer is in communication with said horizontal controller plane layer through the blockchain middleware installed on each of said plurality of controllers and said one or more computational centers.

2. The blockchain secured, software-defined network and monitoring system of claim 1 wherein said at least one computational center is programmed to include a semi-supervised learning-enabled situational awareness tool for extracting useful features from data sets containing both labelled and non-labelled data.

3. The blockchain secured, software-defined network and monitoring system of claim 1 wherein said peer to peer domains further comprise a plurality of virtual IP addresses.

4. The blockchain secured, software-defined network and monitoring system of claim 1 wherein said blockchain middleware comprises:
a peer-to-peer network engine operatively connected to said horizontal controller plane layer;
a consensus engine that determines the ledger structure of the blockchain architecture;
a smart contract engine compiled to a virtual machine and a decentralized application (Dapp) to manage decentralized autonomous operations;
a decentralized machine learning (DML) application programming interface (API) that interacts with a deep learning-driven decision-making layer; and
a block database for critical and limited parameters for smart contract.

5. The blockchain secured, software-defined network and monitoring system of claim 4 wherein said blockchain middleware further comprises a decentralized off-chain encrypted storage for networking situational information and sensing data obtained for application-driven operations.

6. The blockchain secured, software-defined network and monitoring system of claim 5 wherein said networking situational information comprises local and global Quality of Service (QoS), Quality of Experience (QoE) measurements, network topologies or sensing information.

7. A method for ensuring the integrity of a control command between two SDN controllers, or between a computational center of said at least one computational center and an SDN controller, in the blockchain secured, software-defined network and monitoring system of claim 1 comprising:
a. generating a first control signal in a first SDN controller or computational center, said control signal comprising a time stamp and control message data;
b. generating a first hash value for the time stamp and a second hash value for the control message data and combining them to form a sent control signal hash value;
c. saving the sent control signal hash value to the blockchain database via said blockchain middleware; and
d. confirming that a control signal received by a second SDN controller or computational center is said first control signal by: generating hash values for the time stamp and the control message data of the received control signal and combing them to form a received control signal hash value, and comparing said received control signal hash value to the sent control signal hash saved on said blockchain database to confirm that the control signal received by a second SDN controller or computational center is the first control signal.

8. The method of claim 7 wherein the step of generating a first control signal in a first SDN controller or computational center comprises:
 a. collecting or receiving network statistics or data from one or more of said plurality of software-defined network (SDN) controllers or said horizontal data plane layer and transmitting said network statistics or data to at least one of said one or more computational center; and
 b. generating a first control signal based upon the collected or received network statistics or data.

9. The method of claim 8 wherein the network statistics or data are collected and transmitted according to parameters programmed into a smart contract in said blockchain-based security and autonomy management layer.

10. The method of claim 8 wherein first control signal is generated according to one or more parameters programed into a smart contract in said blockchain-based security and autonomy management layer from said collected network statistics or data.

11. A blockchain secured, software-defined network and monitoring system comprising:
 a multi-controller software-defined network (SDN) network layer comprising a plurality of SDN controllers;
 a blockchain based security and autonomy layer comprising a blockchain database that is operatively connected with said plurality of SDN controllers and one or more computational centers; and
 a deep learning-driven decision making layer comprising said one or more computational centers, wherein said computational center that is in communication with said multi-controller software-defined network (SDN) network layer and said blockchain based security and autonomy layer.

12. The blockchain secured, software-defined network and monitoring system of claim 11 further comprising a horizontal data plane layer in communication with said multi-controller software-defined network (SDN) network layer and said one or more computational centers, the horizontal data plane layer comprising a plurality of peer to peer domains each having one or more the domain switches, at least one domain edge switch, and one or more virtual machines.

13. The blockchain secured, software-defined network and monitoring system of claim 12 wherein the one or more of said virtual machines in said horizontal data plane layer contain data.

14. The blockchain secured, software-defined network and monitoring system of claim 11 wherein said blockchain based security and autonomy layer further comprises blockchain middleware installed on each of said plurality of SDN controllers and said one or more computational center.

15. The blockchain secured, software-defined network and monitoring system of claim 14 wherein said blockchain middleware comprises:
 a peer-to-peer network engine operatively connected to operatively connected with said plurality of SDN controllers and said one or more computational center;
 a consensus engine that determines the ledger structure of the blockchain architecture;
 a smart contract engine compiled to a virtual machine and a decentralized application (Dapp) to manage decentralized autonomous operations;
 a decentralized machine learning (DML) application programming interface (API) that interacts with a deep learning-driven decision-making layer; and
 a block database for critical and limited parameters for smart contract.

16. The blockchain secured, software-defined network and monitoring system of claim 15 wherein said blockchain middleware further comprises a decentralized off-chain encrypted storage for networking situational information and sensing data obtained for application-driven operations.

17. A method for extracting useful features from said labelled and non-labelled data contained in the horizontal data plane layer in the blockchain secured, software-defined network and monitoring system of claim 12 comprising:
 a. constructing a blockchain secured, software-defined network and monitoring system according to claim 12;
 b. generating a first control signal in said deep learning-driven decision making layer requesting data contained in the horizontal data plane layer, wherein said first control signal comprises a time stamp and control signal data and the requested data contains both labelled and non-labelled data;
 c. generating a first hash value for said time stamp and a second hash value for said control signal data; and combining said first and second hash values to form a sent control signal hash value, which is saved in said blockchain based security and autonomy layer;
 d. broadcasting said first control signal to one or more of said plurality of SDN controllers, wherein the requested data is collected by said plurality of SDN controllers and transmitted to at least one of said one or more control centers in said deep learning-driven decision making layer, wherein each of said one or more of said plurality of software-defined network (SDN) controllers that receives a control signal generates a third hash value for the time stamp of the received control signal and a fourth hash value for the received control signal data, combines them to form a received control signal hash value; and then verifies the authenticity of the received control signal by comparing said received control signal hash value to the sent control signal hash value saved in the said blockchain based security and autonomy layer;
 e. collecting the requested data from the horizontal data plane layer and transmitting it to one or more of said one or more computational centers; and
 f. extracting useful features from the requested data using the semi-supervised learning-enabled situational awareness tool in said deep learning-driven decision making layer.

18. The method of claim 17 wherein said requested data comprises Quality of Service (QoS) measurements, Quality of Experience (QoE) measurements, network topologies or sensing information.

19. The method of claim 17 wherein said useful features comprise domain knowledge and features presented by the data.

20. The method of claim 18 wherein the step of extracting useful features from said labelled and non-labelled data comprises:
 a) providing a knowledge domain-enabled hybrid semi-supervised learning-enabled situational awareness tool comprising a primary neural network having a first layer, multiple dropout layers, a last layer and a second to last layer, secondary neural network having a first layer, multiple dropout layers, and a last layer, and a latent-feature neural network having a first layer and a last layer, wherein said latent-feature neural network with dropout received data input from the second to last layer of the primary neural network;

b) generating a data set having both labelled and unlabeled data and transmitting said data set to the first layer of said primary neural network and the first layer of said secondary neural network;

c) transmitting the data from the second to last layer of said primary neural network to the first layer of said latent-feature neural network;

d) generating a first loss function comprising the output of the last layer of said primary neural network and a second data set comprising labels;

e) generating a second loss function comprising the output of the last layer of said primary neural network and the output of the last layer of said secondary neural network;

f) generating a third loss function comprising the output of the last layer of said latent-feature neural network;

g) combing said first loss function, said second loss function, and said third loss function to arrive an accumulative loss function;

h) back propagating the data set; and i) repeating steps (a) through (h).

21. The method of claim 20 further comprising stochastic augmentation of the data set prior to the step of transmitting said data set to the first layer of said primary neural network and the first layer of said secondary neural network (step b).

\* \* \* \* \*